United States Patent
Zhao et al.

(10) Patent No.: US 12,293,480 B2
(45) Date of Patent: May 6, 2025

(54) METHOD FOR RECONSTRUCTING THREE-DIMENSIONAL MODEL, METHOD FOR TRAINING THREE-DIMENSIONAL RECONSTRUCTION MODEL, AND APPARATUS

(71) Applicant: Tencent Technology (Shenzhen) Company Limited, Shenzhen (CN)

(72) Inventors: Yandan Zhao, Shenzhen (CN); Shuheng Lin, Shenzhen (CN); Xuan Cao, Shenzhen (CN); Yanhao Ge, Shenzhen (CN); Chengjie Wang, Shenzhen (CN); Weijan Cao, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 96 days.

(21) Appl. No.: 17/976,259

(22) Filed: Oct. 28, 2022

(65) Prior Publication Data

US 2023/0048906 A1 Feb. 16, 2023

Related U.S. Application Data

(63) Continuation of application No. PCT/CN2021/112089, filed on Aug. 11, 2021.

(30) Foreign Application Priority Data

Sep. 15, 2020 (CN) .......................... 202010969615.0

(51) Int. Cl.
G06T 19/20 (2011.01)
G06T 15/04 (2011.01)
G06T 15/50 (2011.01)

(52) U.S. Cl.
CPC .............. *G06T 19/20* (2013.01); *G06T 15/04* (2013.01); *G06T 15/503* (2013.01); *G06T 2219/2021* (2013.01)

(58) Field of Classification Search
CPC ............ G06T 15/04; G06T 2219/2021; G06N 3/0464
See application file for complete search history.

(56) References Cited

U.S. PATENT DOCUMENTS

2001/0043738 A1* 11/2001 Sawhney ................ G06T 15/20
382/154
2008/0309662 A1* 12/2008 Hassner .................... G06T 7/50
345/419

(Continued)

FOREIGN PATENT DOCUMENTS

| CN | 107730519 A | 2/2018 |
| CN | 109284738 A | 1/2019 |
| CN | 111598111 A | 8/2020 |

OTHER PUBLICATIONS

Tran et al., Towards High-fidelity Nonlinear 3D Face Morphable Model, pp. 1-10 (Year: 2019).*

(Continued)

*Primary Examiner* — Samantha (Yuehan) Wang
(74) *Attorney, Agent, or Firm* — Banner & Witcoff, Ltd.

(57) ABSTRACT

This application provides a method for reconstructing a three-dimensional model, a method for training a three-dimensional reconstruction model, an apparatus, a computer device, and a storage medium. The method for reconstructing a three-dimensional model includes: obtaining an image feature coefficient of an input image; respectively obtaining, according to the image feature coefficient, a global feature map and an initial local feature map based on a texture and a shape of the input image; performing edge smoothing on the initial local feature map, to obtain a target local feature (Continued)

map; respectively splicing the global feature map and the target local feature map based on the texture and the shape, to obtain a target texture image and a target shape image; and performing three-dimensional model reconstruction according to the target texture image and the target shape image, to obtain a target three-dimensional model.

20 Claims, 10 Drawing Sheets

(56) References Cited

U.S. PATENT DOCUMENTS

| | | | |
|---|---|---|---|
| 2011/0254840 A1* | 10/2011 | Halstead | G06T 15/04 345/421 |
| 2017/0061701 A1* | 3/2017 | Mittal | G06T 7/90 |
| 2022/0262024 A1* | 8/2022 | Sun | G06T 17/00 |

OTHER PUBLICATIONS

Hwang, et al., 3D Face Modeling Using the Multi-Deformable Method, Sensors 2012, 12, 12870-12889; doi: 10.3390/s121012870, pp. 12870-12889 (Year: 2012).*
Communication pursuant to Rules 70(2) and 70a(2) EPC dated Oct. 17, 2023—EP Application No. 21868354.8.
European Search Report dated Sep. 29, 2023—Application No. 21868354.8.
Tran Luan et al. "Towards High-Fidelity Nonlinear 3D Face Morphable Model", 2019 IEEE/CVF Conference on Computer Vision and Pattern Recognition (CVPR), pp. 1126-1135, Jun. 15, 2019.
Rui Huang et al.: "Beyond Face Rotation: Global and Local Perception GAN for Photorealistic and Identity Preserving Frontal View Synthesis", arxiv.org, Online Library of the Cornell University, Ithaca, NY USA, pp. 1-11, Apr. 13, 2017.
Mohammed Umar et al.: "Visio-lization: Generating Novel Facial Images", ACM SIGGRAPH 2000, New Orleans, LA, USA, pp. 57:1-57:8, Jul. 27, 2009.

* cited by examiner

Convolutional autoencoder

| Convolution layer | Filter/step number | Output size |
|---|---|---|
| Conv11 | 7×7/2 | 112×112×32 |
| Conv12 | 3×3/1 | 112×112×64 |
| Conv21 | 3×3/2 | 56×56×64 |
| Conv22 | 3×3/1 | 56×56×64 |
| Conv23 | 3×3/1 | 56×56×128 |
| Conv31 | 3×3/2 | 28×28×128 |
| Conv32 | 3×3/1 | 28×28×96 |
| Conv33 | 3×3/1 | 28×28×192 |
| Conv41 | 3×3/2 | 14×14×192 |
| Conv42 | 3×3/1 | 14×14×128 |
| Conv43 | 3×3/1 | 14×14×256 |
| Conv51 | 3×3/2 | 7×7×256 |
| Conv52 | 3×3/1 | 7×7×160 |
| Conv53 | 3×3/1 | $7 \times 7 \times (f_s + f_a + 64)$ |
| Averagepooling | 7×7/1 | $1 \times 1 \times (f_s + f_a + 64)$ |
| m | 64×6 | 6 |
| s | 64×27 | 27 |

METHOD FOR RECONSTRUCTING THREE-DIMENSIONAL MODEL, METHOD FOR TRAINING THREE-DIMENSIONAL RECONSTRUCTION MODEL, AND APPARATUS

RELATED APPLICATION

This application is a continuation of International Patent Application No. PCT/CN2021/112089, filed Aug. 11, 2021, which claims priority to Chinese Patent Application No. 2020109696150, entitled "METHOD AND APPARATUS FOR RECONSTRUCTING THREE-DIMENSIONAL MODEL, COMPUTER DEVICE, AND STORAGE MEDIUM" filed on Sep. 15, 2020. The contents of International Patent Application No. PCT/CN2021/112089 and Chinese Patent Application No. 2020109696150 are each incorporated by reference in their entirety.

FIELD OF THE TECHNOLOGY

This application relates to the field of image processing technologies, and in particular, to a method and apparatus for reconstructing a three-dimensional model, a computer device, and a storage medium; and a method and apparatus for training a three-dimensional reconstruction model, a computer device, and a storage medium.

BACKGROUND OF THE DISCLOSURE

With the development of image processing technologies, artificial intelligence technologies such as two-dimensional (2D) image processing and three-dimensional (3D) model reconstruction have emerged, for example, a new face 3D model is reconstructed according to an inputted face image.

The conventional technology obtains a shape image, a texture image, and the like of an input image, and reconstructs a three-dimensional model according to the obtained shape image, texture image, and the like. However, the shape image and the texture image obtained by the conventional technology easily distort, resulting in an inaccurate three-dimensional reconstruction model.

The information disclosed in the above background part is used only for enhancing the understanding of the background of the present invention, and therefore may include information that does not constitute the related art known to a person of ordinary skill in the art.

SUMMARY

Embodiments of this application provide a method and apparatus for reconstructing a three-dimensional model, a computer device, and a storage medium; and a method and apparatus for training a three-dimensional reconstruction model, a computer device, and a storage medium.

A method for reconstructing a three-dimensional model is provided, including:
obtaining an image feature coefficient of an input image;
respectively obtaining, according to the image feature coefficient, a global feature map and an initial local feature map based on a texture and a shape of the input image;
performing edge smoothing on the initial local feature map, to obtain a target local feature map;
respectively splicing the global feature map and the target local feature map based on the texture and the shape, to obtain a target texture image and a target shape image; and
performing three-dimensional model reconstruction according to the target texture image and the target shape image, to obtain a target three-dimensional model.

A method for training a three-dimensional reconstruction model is provided, including:
obtaining an image feature coefficient and a rendering coefficient of a training image;
inputting the image feature coefficient into a three-dimensional reconstruction model based on deep learning, to cause the three-dimensional reconstruction model to: respectively obtain, according to the image feature coefficient, a global feature map and an initial local feature map based on a texture and a shape of the training image; perform edge smoothing on the initial local feature map, to obtain a target local feature map; respectively splice the global feature map and the target local feature map based on the texture and the shape, to obtain a target texture image and a target shape image; and perform three-dimensional model reconstruction according to the target texture image and the target shape image, to obtain a predicted three-dimensional model;
performing image rendering on the predicted three-dimensional model according to the rendering coefficient, to obtain a predicted two-dimensional image; and
training the three-dimensional reconstruction model according to an error between the training image and the predicted two-dimensional image until a convergence condition is met, to obtain a trained three-dimensional reconstruction model.

An apparatus for reconstructing a three-dimensional model is provided, including:
a first coefficient obtaining module, configured to obtain an image feature coefficient of an input image;
a feature map obtaining module, configured to respectively obtain, according to the image feature coefficient, a global feature map and an initial local feature map based on a texture and a shape of the input image;
a smoothing module, configured to perform edge smoothing on the initial local feature map, to obtain a target local feature map;
a feature map splicing module, configured to respectively splice the global feature map and the target local feature map based on the texture and the shape, to obtain a target texture image and a target shape image; and
a first model reconstruction module, configured to perform three-dimensional model reconstruction according to the target texture image and the target shape image, to obtain a target three-dimensional model.

An apparatus for training a three-dimensional reconstruction model is provided, including:
a second coefficient obtaining module, configured to obtain an image feature coefficient and a rendering coefficient of a training image;
a second model reconstruction module, configured to input the image feature coefficient into a three-dimensional reconstruction model based on deep learning, to cause the three-dimensional reconstruction model to: respectively obtain, according to the image feature coefficient, a global feature map and an initial local feature map based on a texture and a shape of the training image; perform edge smoothing on the initial local feature map, to obtain a target local feature map; respectively splice the global feature map and the target local feature map based on the texture and the shape, to obtain a target texture image and a target shape image;

and perform three-dimensional model reconstruction according to the target texture image and the target shape image, to obtain a predicted three-dimensional model;

an image rendering module, configured to perform image rendering on the predicted three-dimensional model according to the rendering coefficient, to obtain a predicted two-dimensional image; and a reconstruction model training module, configured to train the three-dimensional reconstruction model according to an error between the training image and the predicted two-dimensional image until a convergence condition is met, to obtain a trained three-dimensional reconstruction model.

A computer device is provided, including a memory and one or more processors, the memory storing computer-readable instructions, the computer-readable instructions, when executed by the one or more processors, causing the one or more processors to perform the steps of the method for reconstructing a three-dimensional model and the method for training a three-dimensional reconstruction model described above.

One or more non-transitory computer-readable storage media are provided, storing computer-readable instructions, the computer-readable instructions, when executed by one or more processors, causing the one or more processors to perform the steps of the method for reconstructing a three-dimensional model and the method for training a three-dimensional reconstruction model described above.

A computer program product or computer program is provided, including computer-readable instructions, the computer-readable instructions being stored in a computer-readable storage medium. A processor of a computer device reads the computer-readable instructions from the computer-readable storage medium, and executes the computer-readable instructions, to cause the computer device to perform the steps of the method for reconstructing a three-dimensional model and the method for training a three-dimensional reconstruction model described above.

BRIEF DESCRIPTION OF THE DRAWINGS

To describe the technical solutions in the embodiments of this application more clearly, the following briefly describes accompanying drawings required for describing the embodiments. Apparently, the accompanying drawings in the following description show merely some embodiments of this application, and a person skilled in the art may still derive other drawings from these accompanying drawings without creative efforts.

DESCRIPTION OF EMBODIMENTS

Figure 1:
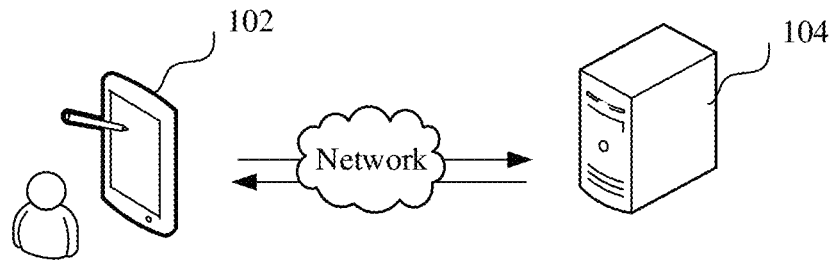
FIG. 1 is a diagram of an application environment of a method for reconstructing a three-dimensional model and a method for training a three-dimensional reconstruction model according to an embodiment.

To make objectives, technical solutions, and advantages of this application clearer and more understandable, this application is further described in detail below with reference to the accompanying drawings and the embodiments. It is to be understood that the specific embodiments described herein are only used for explaining this application, and are not used for limiting this application.

The embodiments of this application provide a method and apparatus for reconstructing a three-dimensional model, a computer device, and a storage medium; and a method and apparatus for training a three-dimensional reconstruction model, a computer device, and a storage medium, which can be implemented based on an artificial intelligence (AI) technology. Artificial intelligence is a theory, method, technology, and application system that uses a digital computer or a machine controlled by the digital computer to simulate, extend, and expand human intelligence, perceive an environment, acquire knowledge, and use knowledge to obtain an optimal result. In other words, artificial intelligence is a comprehensive technology of computer science, which attempts to understand the essence of intelligence and produce a new type of intelligent machine that can react in a similar way to human intelligence. Artificial intelligence is to study design principles and implementation methods of various intelligent machines, so that the machines have the functions of perception, reasoning, and decision-making. The artificial intelligence technology is a comprehensive discipline, covering a wide range of fields including both a hardware-level technology and a software-level technology. The basic artificial intelligence technology generally includes technologies such as sensors, dedicated artificial intelligence chips, cloud computing, distributed storage, big data processing technologies, operating/interaction systems, and mechatronics. An artificial intelligence software technology mainly includes fields such as a computer vision technology, a speech processing technology, a natural language processing technology, and machine learning/deep learning.

Specifically, the embodiments of this application may be implemented based on a computer vision (CV) technology. Computer vision is a science that studies how to use a machine to "see", and furthermore, that uses a camera and a computer to replace human eyes to perform machine vision such as recognition, tracking, and measurement on an object, and further perform graphic processing, so that the computer processes the object into an image more suitable for human eyes to observe, or an image transmitted to an instrument for detection. As a scientific subject, the computer vision studies related theories and technologies and attempts to establish an artificial intelligence system that can obtain information from images or multidimensional data. The computer vision technology generally includes technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biological feature recognition technologies such as common face recognition and fingerprint recognition.

In addition, the embodiments of this application may be applied to an artificial intelligence cloud service. The artificial intelligence cloud service is generally referred to as that AI as a Service (AIaaS). This is a service manner of a current mainstream artificial intelligence platform. Specifically, an AIaaS platform splits several types of common AI services, and provides independent or packaged services in a cloud. This service mode is similar to opening an AI-themed mall: all developers can access and use one or more artificial intelligence services provided by a platform through an application programming interface (API). For example, three-dimensional reconstruction is performed on an input image and the input image is outputted in a two-dimensional form. Some experienced developers can also use an AI framework and AI infrastructure provided by the platform to deploy and maintain their own cloud artificial intelligence services.

The method for reconstructing a three-dimensional model and the method for training a three-dimensional reconstruction model provided in this application each is applicable to an application environment shown in FIG. 1. A terminal 102 communicates with a server 104 by using a network. The terminal and the server may be directly or indirectly connected in a wired or wireless communication manner. This is not limited in this application. The terminal 102 may be, but is not limited to, a personal computer, a notebook computer, a smartphone, a tablet computer, or a portable wearable device. The server 104 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform.

The terminal 102 and the server 104 each may be independently configured to perform the method for reconstructing a three-dimensional model and the method for training a three-dimensional reconstruction model in the embodiments of this application.

For example, the server obtains an image feature coefficient of an input image; and respectively obtains, according to the image feature coefficient, a global feature map and an initial local feature map based on a texture and a shape of the input image. The server performs edge smoothing on the initial local feature map, to obtain a target local feature map; and respectively splices the global feature map and the target local feature map based on the texture and the shape, to obtain a target texture image and a target shape image. The server performs three-dimensional model reconstruction according to the target texture image and the target shape image, to obtain a target three-dimensional model. The server may send the obtained target three-dimensional model to the terminal for display.

The terminal 102 and the server 104 may also be collaboratively configured to perform the method for reconstructing a three-dimensional model and the method for training a three-dimensional reconstruction model in the embodiments of this application.

For example, the server obtains a training image from the terminal. The server obtains an image feature coefficient and a rendering coefficient of a training image, and the server inputs the image feature coefficient into a three-dimensional reconstruction model based on deep learning, to cause the three-dimensional reconstruction model to: respectively obtain, according to the image feature coefficient, a global feature map and an initial local feature map based on a texture and a shape of the training image; perform edge smoothing on the initial local feature map, to obtain a target local feature map; respectively splice the global feature map and the target local feature map based on the texture and the shape, to obtain a target texture image and a target shape image; and perform three-dimensional model reconstruction according to the target texture image and the target shape image, to obtain a predicted three-dimensional model. The server performs image rendering on the predicted three-dimensional model according to the rendering coefficient, to obtain a predicted two-dimensional image. The server trains the three-dimensional reconstruction model according to an error between the training image and the predicted two-dimensional image until a convergence condition is met, to obtain a trained three-dimensional reconstruction model. The server may perform three-dimensional reconstruction based on the trained three-dimensional reconstruction model. The server may alternatively send the trained three-dimensional reconstruction model to the terminal, and the terminal may perform three-dimensional reconstruction through the trained three-dimensional reconstruction model.

In the method and apparatus for reconstructing a three-dimensional model, the computer device, and the storage medium, the method and apparatus for training a three-dimensional reconstruction model, the computer device, and the storage medium described above, a global feature map and an initial local feature map based on a texture and a shape of an input image are respectively obtained according to an image feature coefficient; edge smoothing is performed on the initial local feature map, to obtain a target local feature map, where an edge region of the target local feature map is in a smooth state; the global feature map and the target local feature map are respectively spliced based on the texture and the shape, to obtain a target texture image and a target shape image with smooth edges; and a target three-dimensional model reconstructed according to the target texture image and the target shape image does not easily distort.

In an embodiment, a method for reconstructing a three-dimensional model is provided, and an example in which the method is applied to a computer device is used for description. The computer device may be the terminal 102 or the server 104 in FIG. 1.

Figure 2:
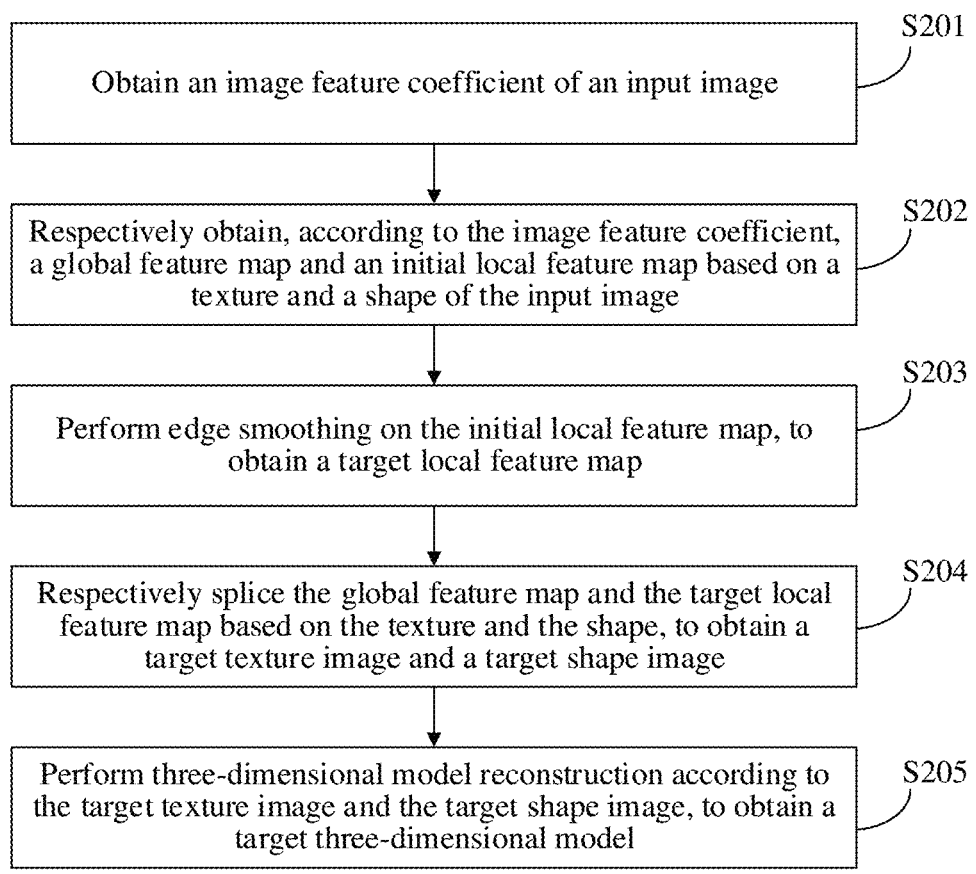
FIG. 2 is a schematic flowchart of a method for reconstructing a three-dimensional model according to an embodiment.

Specifically, as shown in FIG. 2, the method includes the following steps:

S201. Obtain an image feature coefficient of an input image.

The input image may be an image including various types of objects, such as a human face image, an animal image, or a building image. In an embodiment, the input image may be formed by a global feature and a local feature. By using the human face image as an example, the global feature may be a rough feature of an entire face, and the local feature may be a detailed feature of a facial organ (such as: an eye, a nose, a mouth, or an ear). In addition, the input image may be one image or a plurality of images including different information. When there are a plurality of input images, these input images may be processed synchronously or asynchronously, and a plurality of corresponding target three-dimensional models may be respectively reconstructed.

In an embodiment, a feature corresponding to an image (which may be referred to as an image feature) may be a color feature, a texture feature (where the texture feature is a visual feature reflecting a homogeneous phenomenon in the image, which reflects a surface structure organization and arrangement property with slow or periodic changes of a surface of an object), a shape feature (which may include a contour feature and a region feature, where the contour feature is mainly for an outer boundary of an object, and the region feature is related to an entire shape region), a spatial relationship feature (which may refer to an arrangement relationship between objects in the image), or the like of the image. The image feature coefficient may be a coefficient representing an image feature, and may be a coefficient describing a global, local, texture, or shape feature of an image. In an embodiment, the image feature coefficient may be a texture feature coefficient, a shape feature coefficient, and the like. The texture feature coefficient may be a coefficient describing the texture feature, and specifically, may be a coefficient describing a surface structure organization and arrangement property of the image. The shape feature coefficient may be a coefficient describing the shape feature, and specifically, may be a coefficient describing an image contour and an image region.

In an embodiment, the obtaining an image feature coefficient of an input image may be implemented by using a network model based on deep learning. Specifically, the network model may be an autoencoder, or the like. Deep learning (DL) is a new research direction in the field of machine learning (ML), which is introduced into machine learning to enable the machine learning to be closer to the original goal artificial intelligence. At the same time, deep learning is to learn inherent laws and representation levels of sample data, and information obtained in these learning processes is of great help to interpretation of data such as images. An ultimate goal of deep learning is to enable machines to have the ability to analyze and learn like human, to recognize data such as images.

S202. Respectively obtain, according to the image feature coefficient, a global feature map and an initial local feature map based on a texture and a shape of the input image.

The global feature map may be a feature map used for describing global information of the input image. The global feature map can represent entire image information. A size of the global feature map may be the same as or less than that of the input image. The global feature map focuses on the entirety of the image and has stronger noise robustness. The local feature map may be a feature map used for describing local information of the input image, and may be a feature map corresponding to at least one local region. A size of the local feature map may be less than or equal to that of the global feature map. A region focused by the local feature map is smaller, which aims to generate more details. In an embodiment, by using a face image as an example, the global feature map may be a facial global feature map representing an entire face situation, the facial global feature map includes fuzzy entire face information, the local feature map may be a key part feature map representing a situation of a local region such as an eye, a mouth, a nose, an ear, hair, or eyebrows, and the key part feature map includes clear local region detail information, such as: eye position, a contour, eyeball size, or pupil color.

In an embodiment, the global feature map based on the texture may be a global texture feature map, and the global feature map based on the shape may be a global shape feature map. The initial local feature map based on the texture may be an initial local texture feature map, and the initial local feature map based on the shape may be an initial local shape feature map. In an embodiment, the global texture feature map and the initial local texture feature map of the input image may be obtained according to the texture feature coefficient, and the global shape feature map and the initial local shape feature map of the input image may be obtained according to the shape feature coefficient.

S203. Perform edge smoothing on the initial local feature map, to obtain a target local feature map.

In this step, edge smoothing is performed on the initial local feature map, and an image obtained after edge smoothing is used as the target local feature map. Specifically, edge smoothing may be respectively performed on the initial local texture feature map and the initial local shape feature map, to obtain a target local texture feature map and a target local shape feature map as the target local feature map.

Edge smoothing may refer to smoothing an edge region of an image. The smoothing may refer to performing feature value gradient processing, for example, color channel values of the image gradually decrease in a certain direction.

In addition, this embodiment of the present invention can implement processing of global and local features through a dual-branch local detail enhancement (global-local) model. After the local detail enhancement model receives the input image, one branch regresses to the global information (the global feature map), and the another branch regresses to the local information (the local feature map). A target image including the entire information can be generally obtained after the global feature map and the local feature map are spliced (a splicing process of the feature maps refer to S204).

S204. Respectively splice the global feature map and the target local feature map based on the texture and the shape, to obtain a target texture image and a target shape image.

The target texture image is a texture image obtained by integrating the global texture feature and the local texture feature, and the target shape image is a shape image obtained by integrating the global shape feature and the local shape feature. The target texture image and the target shape image each may be a two-dimensional image.

In this step, the global feature map and the target local feature map are spliced, and a target image including the global feature and the local feature may be obtained, where the target image includes the target texture image and the target shape image. In an embodiment, in this step, the global feature map and the target local feature map are spliced based on the texture to obtain the target texture image, and the global feature map and the target local feature map are spliced based on the shape to obtain the target shape image.

In some embodiments, edge smoothing may also be performed on the global feature map, and the global feature map after edge smoothing and the target local feature map are spliced, to obtain the corresponding target texture image and target shape image.

S205. Perform three-dimensional model reconstruction according to the target texture image and the target shape image, to obtain a target three-dimensional model.

A three-dimensional model refers to a digital model file including three-dimensional spatial coordinates of sampling points on a surface of an object.

An implementation process of S205 may include: reconstructing a spatial contour of a three-dimensional model according to the target shape image, and adding the target texture image to a surface of the spatial contour, to obtain the target three-dimensional model carrying texture information.

Figure 3:
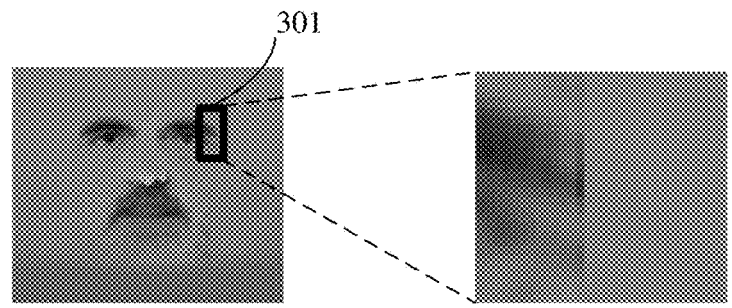
FIG. 3 is a schematic diagram of a texture image with discontinuous edges according to an embodiment.
Figure 4:
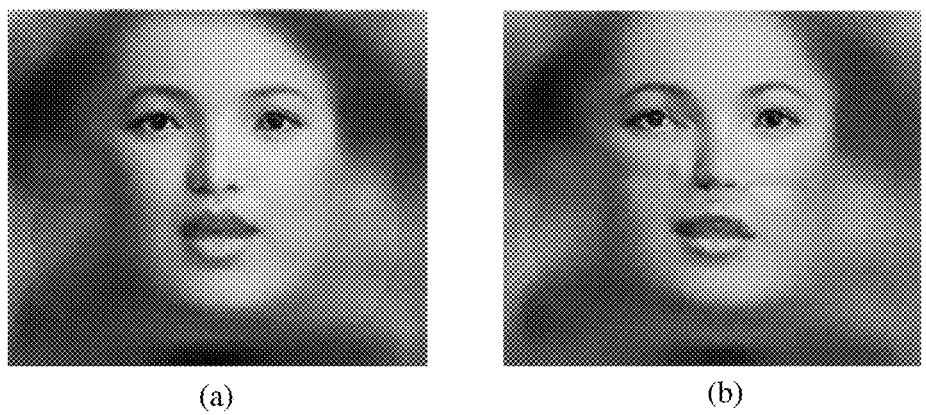
FIG. 4 is a schematic diagram of a texture image with discontinuous edges according to another embodiment.
Figure 5:
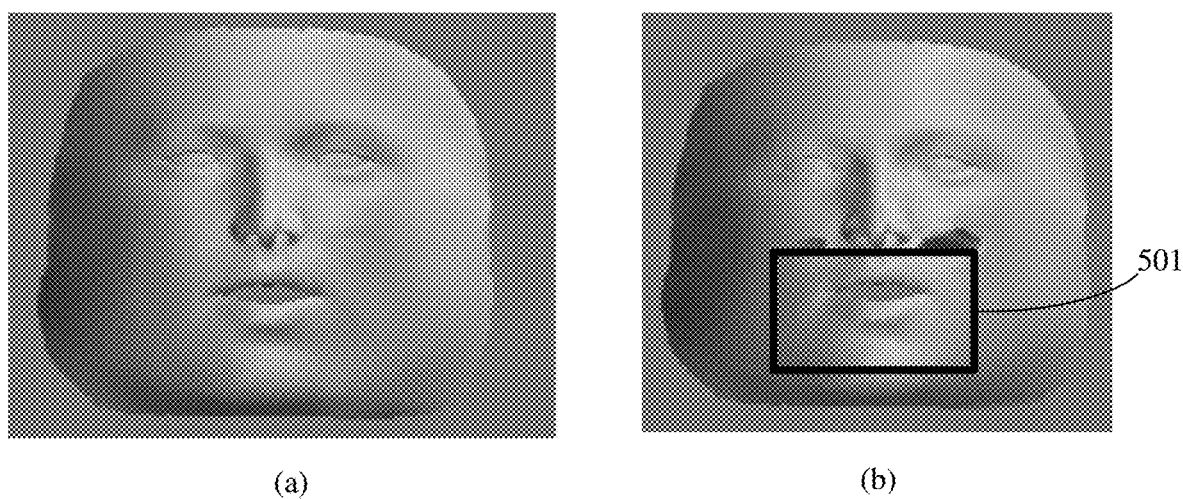
FIG. 5 is a schematic diagram of a shape image with discontinuous edges according to an embodiment.

In an embodiment, a size of the local feature map is often less than that of the global feature map. To splice the global feature map and the local feature map, the local feature map needs to have a same size as the global feature map, and pixels at same positions are then fused, to obtain an image that fuses the global feature and the local feature. Based on this, feature value padding needs to be performed on the local feature map, so that the local feature map has the same size as the global feature map. For example, by padding the local feature map with 0 (that is, setting feature values of pixels in an external region of the local feature map to 0), the local feature map has the same size as the global feature map, and the local feature map and the global feature map are then spliced at the same size. In this way, a problem that an edge of the local feature map after splicing abruptly changes is caused. After the local feature map and the global feature map are spliced, during a convolution process, when a convolution kernel does not move to a position corresponding to the local feature map, only information of the global feature map is convolutionally received by the convolution kernel due to padding with 0. When the convolution kernel moves to the position corresponding to the local feature map, the convolution kernel can receive information of the global feature map and the local feature map at the same time. However, when the convolution kernel moves to an edge of the local feature map, information received by the convolution kernel changes from only the global information to the global information plus the local information, and the obtained information abruptly increases, so that a convolution output at this position abruptly changes compared to before, resulting in the discontinuity of a finally generated result. FIG. 3 is a texture image obtained by splicing a global texture feature map and a local texture feature map in the conventional technology, where an image on the right is an image after zooming in an eye edge region 301 in the texture feature map on the left. It can be seen that edge positions of the texture image have significant discontinuity. When zooming in to the whole face, the discontinuity also causes entire distortion of the texture image. FIG. 4 is a schematic diagram of a texture image with discontinuous edges according to an embodiment, where FIG. 4(a) has a normal texture, and FIG. 4(b) has a distorted texture. It is obvious that edges of a mouth region in FIG. 4(b) distort. In another aspect, the discontinuity also acts on a shape image, and generates uncontrollable distortion at edge positions of the local feature map. FIG. 5 is a schematic diagram of a shape image with discontinuous edges according to an embodiment, where FIG. 5(a) has a normal shape, FIG. 5(b) has a distorted shape, and 501 represents a mouth region. It is obvious that edges of the mouth region in FIG. 5(b) distort. In addition, the discontinuity also generates an obvious block phenomenon during the model reconstruction process, so that a finally reconstructed target three-dimensional model discontinuously changes abruptly, for example, there is obvious color jump in an eye corner region.

In an embodiment, the above method for reconstructing a three-dimensional model can be implemented based on a three-dimensional reconstruction model (which may be a neural network based on deep learning, where the three-dimensional reconstruction model can be reconstructed based on the input image). Specifically, the computer device inputs an image of a to-be-reconstructed three-dimensional model into a trained three-dimensional reconstruction model, and the three-dimensional reconstruction model extracts an image feature coefficient of the input image. Alternatively, the computer device inputs the image feature coefficient corresponding to the image of the to-be-reconstructed three-dimensional model into the trained three-dimensional reconstruction model. After the image feature coefficient is obtained, the three-dimensional reconstruction model respectively generates, according to the image feature coefficient, a global feature map and an initial local feature map based on a texture and a shape of the input image; performs edge smoothing on the initial local feature map, to obtain a target local feature map; respectively splices the global feature map and the target local feature map based on the texture and the shape, to obtain a target texture image and a target shape image; and performs three-dimensional model reconstruction according to the target texture image and the target shape image, to obtain a target three-dimensional model corresponding to the input image. The three-dimensional reconstruction model outputs the target three-dimensional model.

In the method for reconstructing a three-dimensional model in this embodiment of the present invention, a global feature map and an initial local feature map based on a texture and a shape of an input image are respectively obtained according to an image feature coefficient; edge smoothing is performed on the initial local feature map, to obtain a target local feature map, where an edge region of the target local feature map is in a smooth state; the global feature map and the target local feature map are respectively spliced based on the texture and the shape, to obtain a target texture image and a target shape image with smooth edges; and a target three-dimensional model is reconstructed according to the target texture image and the target shape image, thereby effectively reducing the discontinuous problem of a texture image and a shape image, and suppressing the distortion problem of the reconstructed target three-dimensional model.

In an embodiment, the performing edge smoothing on the initial local feature map, to obtain a target local feature map includes: obtaining a boundary of the initial local feature map; obtaining distances between pixels in the initial local feature map and the boundary; and performing edge smoothing on the initial local feature map according to the distances, to obtain the target local feature map.

The boundary of the initial local feature map may be an outermost boundary line of the initial local feature map. Because the initial local feature map may correspond to boundaries in different directions, there may be more than one boundary (for example, there are four boundaries for a block boundary). Based on this, the distances between the pixels in the initial local feature map and the boundary may be distances between the pixels and closet boundaries.

In this embodiment, edge smoothing is performed on the initial local feature map according to the distances between the pixels and the boundary. The smoothing may refer to adjusting feature values of the pixels (where the feature values may be color values such as RGB values, or brightness values of the pixels) according to a certain gradient, for example: colors of pixels from a center of the image to the boundary of the image are set to be darker and darker.

In an embodiment, smoothing with different gradients may be performed according to different distances. For example, in a specific direction, feature value adjustment with a higher degree is performed on long-distance pixels (pixels farther from the boundary), and feature value adjustment with a lower degree is performed on short-distance pixels.

In an embodiment, a pre-constructed edge smoothing model may perform feature learning on the initial local feature map, determine the boundary of the initial local feature map, determine the distances between the pixels in the initial local feature map and the boundary, and then perform edge smoothing on the initial local feature map according to the distances, to obtain the target local feature map, so as to resolve the discontinuity caused by the convolution stage while ensuring the accuracy.

In the above embodiment, distances between pixels in an initial local feature map and a boundary are determined, and edge smoothing is performed according to the distances, so that pixels with different distances have different feature values, and the smooth transition effect of edges is realized. In this way, a convolution kernel smoothly transitions when moving from a position corresponding to a global feature map to a position corresponding to a local feature map, thereby avoiding the discontinuous situation after the local feature map are spliced.

In an embodiment, the performing edge smoothing on the initial local feature map according to the distances, to obtain the target local feature map includes: obtaining an edge region of the initial local feature map according to the distances; determining feature weight values corresponding to pixels of the edge region according to the distances, to cause a feature weight value corresponding to a long-distance pixel to be greater than a feature weight value corresponding to a short-distance pixel; generating a gradient smooth feature map according to feature weight values corresponding to the pixels of the initial local feature map, where a feature weight value corresponding to a pixel located outside the edge region of the initial local feature map is a preset weight value, and feature values of pixels in the gradient smooth feature map are obtained according to the corresponding feature weight values; and multiplying the feature values of the pixels in the gradient smooth feature map by feature values of the corresponding pixels in the initial local feature map, to obtain the target local feature map according to a multiplication result.

When there are more than one initial local feature map, corresponding gradient smooth feature maps may be targetedly determined. By using an example in which the initial local feature maps include a left eye local feature map, a right eye local feature map, a nose local feature map, and a mouth local feature map, a left eye gradient smooth feature map, a right eye gradient smooth feature map, a nose gradient smooth feature map, and a mouth gradient smooth feature map may be targetedly determined.

By using an example in which the initial local feature maps are the left eye local feature map, the right eye local feature map, the nose local feature map, and the mouth local feature map, a gradient smooth feature map $f_i$ may be represented as the following formula:

$$f_i = \begin{cases} 1, & \lambda_i < h < h_i - \lambda_i, \lambda_i < w < w_i - \lambda_i \\ (k+1) * \dfrac{1}{\lambda_i + 1}, & \text{other } (h, w) \end{cases}$$

where, $i \in$ (nose, mouth, left eye, right eye); a size of $f_i$ is the same as a size of a corresponding initial local feature map $L_i$ (including: $L_{nose}$, $L_{mouth}$, $L_{left\ eye}$, $L_{right\ eye}$); h represents a vertical axis distance between a pixel in the gradient smooth feature map and a reference point (which may be a point at the lower left corner of the feature map); w represents a horizontal axis distance between a pixel in the gradient smooth feature map and the reference point; (h, w) represents a pixel in the gradient smooth feature map; k is a distance between the point (h, w) and a closet boundary; $\lambda_i$ represents an evaluation coefficient of a gradient smooth feature map, and is used for characterizing a width of an edge region, and a size thereof may be determined according to the size of the corresponding initial local feature map, for example, $\lambda_i < \frac{1}{2} \min(h_i, w_i)$; $h_i$ represents a height of an initial local feature map; $w_i$ represents a width of an initial local feature map; $\lambda_i < h < h_i - \lambda_i, \lambda_i < w < w_i - \lambda_i$ represents a non-edge region (or referred to as a center region) in the corresponding initial local feature map, and feature weight values of the non-edge region are set to 1; and other (h, w) represents the edge region in the corresponding initial local feature map, feature weight values of the edge region are determined in a linear or stepwise manner according to distances between pixels and a boundary, and a longer distance indicates a greater feature weight value.

Figure 6:
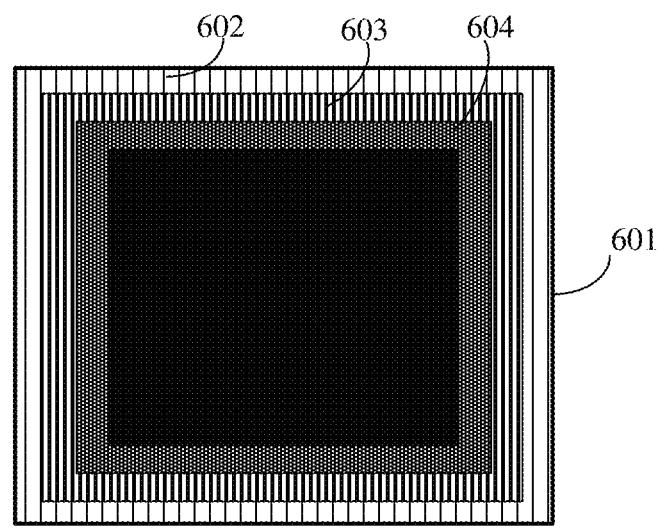
FIG. 6 is a schematic structural diagram of a gradient smooth feature map according to an embodiment.

The feature weight values are determined in a stepwise manner, and a gradient smooth feature map obtained according to the feature weight values is shown in FIG. 6, where an outer solid-line block represents a boundary 601, a region between the outer solid-line block and an inner solid-line block represents an edge region, the edge region includes regions 602, 603, and 604 with three gradients, and gray values of pixels in the regions 602, 603, and 604 gradually change from low to high, thereby forming the gradient smooth feature map in which edges gradually transition.

In an embodiment, the feature weight values may be set in a range of [0, 1], for example, a feature weight value of a longest-distance pixel farthest from the boundary in the edge region is set to 0.9, and a feature weight value of a shortest-distance pixel closest to the boundary is set to 0.1. In addition, a region other than the edge region in the initial local feature map may be referred to as a non-edge region, and feature weight values of the non-edge region may be set to 1, that is, feature value adjustment is not performed in the non-edge region. In an embodiment, the generating a gradient smooth feature map according to feature weight values may include: constructing a blank feature map with a same size as the initial local feature map, where initial feature values of pixels in the blank feature map are 0; using the calculated feature weight value as new feature values of the corresponding pixels; and updating the feature values of the pixels, to obtain the gradient smooth feature map.

After the gradient smooth feature map is obtained, feature values of pixels at corresponding positions in the gradient smooth feature map and the initial local feature map are multiplied. By using the left eye as an example, when performing feature value multiplication, feature values of pixels in the left eye gradient smooth feature map may be multiplied by feature values of corresponding pixels in the left eye local feature map, to obtain a left eye target local feature map according to a multiplication result. In addition, by using the feature values being gray values as an example, for a specific position, the position corresponds to a pixel a1 in the gradient smooth feature map, and corresponds to a pixel a2 in the initial local feature map. Assuming that a feature value of a1 is 0.5 and a feature value of a2 is 200, 0.5 is multiplied by 200 to obtain a new gray value 100, and the gray value 100 is a feature value of a corresponding pixel in the target local feature map.

Figure 7:
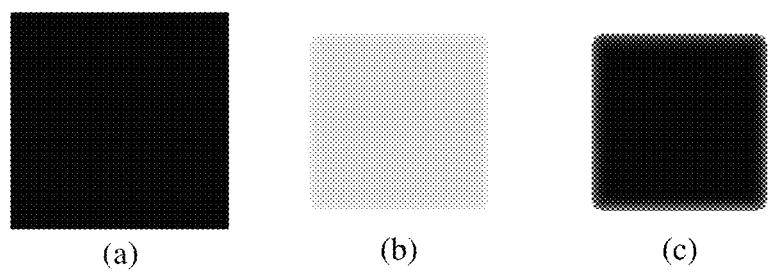
FIG. 7 is a schematic diagram of an effect of gradient smoothing according to an embodiment.

In an embodiment, FIG. 7 is a schematic diagram of an effect of edge smoothing according to an embodiment, where FIG. 7(a) represents an initial local feature map, and FIG. 7(b) represents a gradient smooth feature map. It can be seen from FIG. 7(a) that, edges of the initial local feature map are more obvious and have stronger jump. If the initial local feature map is directly spliced with the global feature map, the problem that edges are discontinuous easily occurs. Edge smoothing is performed on an edge region in FIG. 7(b), smooth transition of edges shows a strong-center and weak-edge effect, and the effect intensity gradually decreases from the center to the edges. After feature values of corresponding pixels in the gradient smooth feature map and the initial local feature map are multiplied, a target local feature map shown in FIG. 7(c) is obtained. It can be seen that, edges of the target local feature map in FIG. 7(c) transition smoothly, and after the target local feature map and the global feature map are spliced, a target image with continuous edges can be obtained.

In the above embodiment, corresponding feature weight values are set for pixels in an edge region according to distances, a gradient smooth feature map is generated accordingly, and then feature values of corresponding pixels in an initial local feature map are adjusted through the gradient smooth feature map, to obtain a target local feature map. Through a simple and intuitive method, edge smoothing of a local feature map is implemented, and a target local feature map with smooth edges can be quickly obtained, thereby resolving the problem of discontinuous edges generated after the local feature map and a global feature map are spliced and convolved, and reducing the distortion problem of a final target image.

In an embodiment, the input image is a face image; the target local feature map includes a key part feature map corresponding to a facial key part; and the respectively splicing the global feature map and target local feature map based on the texture and the shape, to obtain a target texture image and a target shape image includes: respectively performing feature value padding on external regions of key part feature maps, to obtain padded key part feature maps with a same size as the global feature map; merging the padded key part feature maps, to obtain a facial organ feature map; and respectively splicing the global feature map and the facial organ feature map based on the texture and the shape, to obtain the target texture image and the target shape image.

Figure 8:
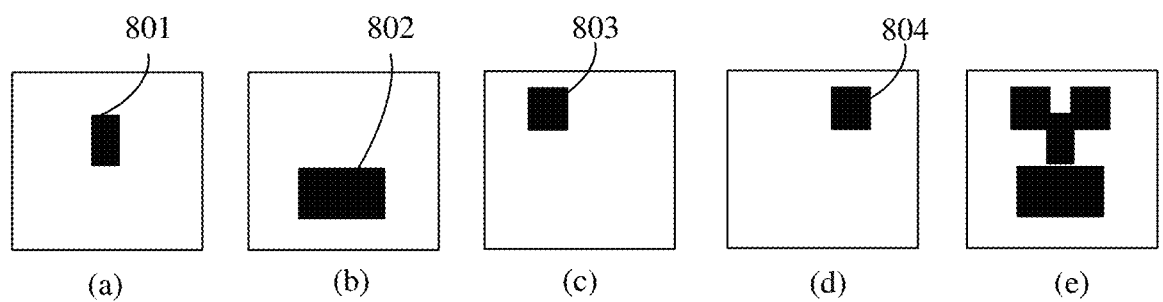
FIG. 8 is a schematic diagram of an effect of feature value padding and merging of key part feature maps according to an embodiment.

The face may be a human face, an animal face, or the like. In an embodiment, the facial key part may be eyes (including a left eye and right eye), a nose, a mouth, ears, or the like. FIG. 8 is a schematic diagram of an effect of feature value padding and merging of key part feature maps according to an embodiment. Padded key part feature maps (the nose, the mouth, the left eye, and the right eye) obtained after performing feature value padding (such as padding with 0) on key part feature maps respectively corresponding to the nose, the mouth, the left eye, and the right eye may be respectively shown in (a), (b), (c), and (d) in FIGS. 8, and 801/802/803/804 respectively represent regions where the nose, the mouth, the left eye, and the right eye are located. These padded key part feature maps are merged, and the regions 801, 802, 803, and 804 where the nose, the mouth, the left eye, and the right eye are located are integrated, so that a facial organ feature map shown in FIG. 8(e) can be obtained.

In the above embodiment, feature value padding is performed on key part feature maps, to obtain padded key part feature maps with a same size as a global feature map, and the global feature map and the padded key part feature maps with the same size can be conveniently superimposed together, so that a convolution kernel can perform convolution, and then a facial organ feature map can be obtained. On a basis that the facial organ feature map and the global feature map can be effectively spliced, a target texture image and a target shape images with continuous edges are generated.

In an embodiment, the input image is a face image; the target local feature map includes a left eye feature map, a right eye feature map, a nose feature map, and a mouth feature map; and the respectively splicing the global feature map and target local feature map based on the texture and the shape, to obtain a target texture image and a target shape image includes: performing feature value padding on external regions of the left eye feature map, the right eye feature map, the nose feature map, and the mouth feature map, to obtain a target left eye feature map, a target right eye feature map, a target nose feature map, and a target mouth feature map that have a same size as the global feature map; merging the target left eye feature map, the target right eye feature map, the target nose feature map, and the target mouth feature map, to obtain a facial organ feature map; and respectively splicing the global feature map and the facial organ feature map based on the texture and the shape, to obtain the target texture image and the target shape image.

In the above embodiment, feature maps corresponding to a left eye, a right eye, a nose, and a mouth in a face image are obtained, these feature maps are merged to obtain a facial organ feature map, and the facial organ feature map and a global feature map are spliced, to obtain accurate and reliable target texture image and target shape image.

Figure 9:
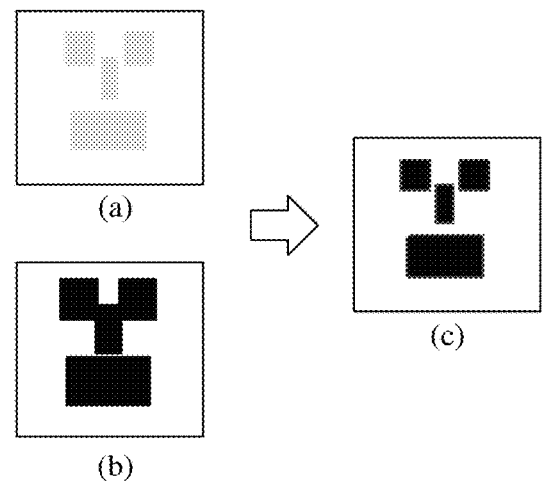
FIG. 9 is a schematic diagram of a process of obtaining a target facial organ feature map according to an embodiment.

In an embodiment, edge smoothing may be performed on the facial organ feature map, to obtain a target facial organ feature map; and the global feature map and the target facial organ feature map are spliced based on the texture and the shape, to obtain the target texture image and the target shape image. FIG. 9 is a schematic diagram of a process of obtaining a target facial organ feature map according to an embodiment. An implementation process of performing edge smoothing on the facial organ feature map to obtain the target facial organ feature map may be as follows: constructing an organ gradient smooth feature map (shown in FIG. 9(a)) corresponding to a facial organ feature map, obtaining the facial organ feature map (shown in FIG. 9(b)), and multiplying feature values of corresponding pixels in the organ gradient smooth feature map and the facial organ feature map, to obtain the target facial organ feature map shown in FIG. 9(c).

In the above embodiment, edge smoothing is performed on a facial organ feature map, and a target facial organ feature map with gradient edges can be obtained, thereby effectively weakening the sense of separation of edges of a target texture image and a target shape image, so that a finally obtained target three-dimensional model has continuous edges, and a distortion probability of the three-dimensional model is effectively reduced.

In an embodiment, the global feature map includes a global texture feature map and a global shape feature map, the target local feature map includes a local texture feature map and a local shape feature map; and the respectively splicing the global feature map and target local feature map based on the texture and the shape, to obtain a target texture image and a target shape image includes: splicing the global feature map and the target local feature map based on the texture, to obtain a target texture image; and splicing the global feature map and the target local feature map based on the shape, to obtain a target shape image.

In an embodiment, the splicing the global feature map and the target local feature map based on the texture, to obtain a target texture image includes: splicing the global texture feature map and the local texture feature map, and convolving a spliced feature map to integrate a global texture feature and a local texture feature, to obtain the target texture image.

In an embodiment, the splicing the global feature map and the target local feature map based on the shape, to obtain a target shape image includes: splicing the global shape feature map and the local shape feature map, and convolving a spliced feature map to integrate a global shape feature and a local shape feature, to obtain the target shape image.

In the above embodiment, a global feature map and a local feature map are respectively spliced based on a texture and a shape, and a spliced feature map is convolved, so that a target image that fuses a global feature and a local feature can be obtained; and a target three-dimensional model is reconstructed according to the target image. The target three-dimensional model fuses various aspects of information, can more comprehensively characterize image information, and corresponds to an input image as much as possible, so that reliable reconstruction of the three-dimensional model is realized.

In an embodiment, the global feature map and the local feature map may be formed by more than one layer, namely, a plurality of layers of feature maps. In this case, after the global feature map and the local feature map are spliced, a convolution module needs to be used, to integrate the global information and the local information. In an embodiment, the global feature map and the target local feature map each correspond to at least one feature channel; and the respectively splicing the global feature map and target local feature map based on the texture and the shape, to obtain a target texture image and a target shape image includes: respectively splicing the global feature map and the target local feature map in each feature channel based on the texture and the shape, and convolving a feature map spliced in each feature channel to integrate the global feature and the local feature, to obtain the target texture image and the target shape image.

Figure 10:
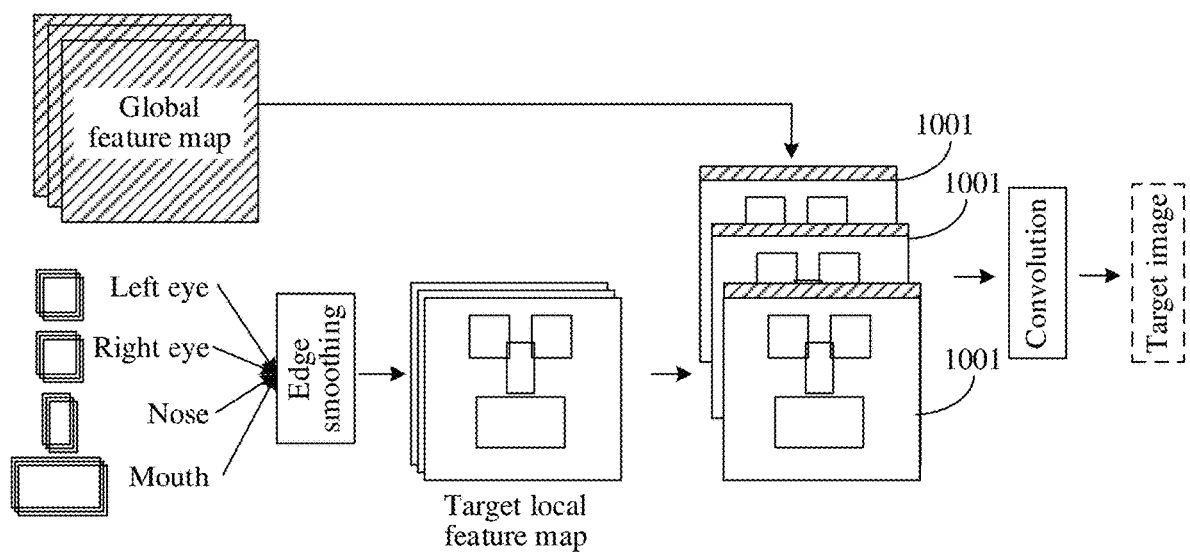
FIG. 10 is a schematic diagram of a feature map processing procedure of a plurality of feature channels according to an embodiment.

A feature map processing procedure of a plurality of feature channels (both a processing procedure based on a texture and a processing procedure based on a shape can be implemented through the processing procedure of this figure, that is, the processing procedures of the texture and the shape can be the same) is shown in FIG. 10. Specifically, global feature maps and initial local feature maps (initial local feature maps corresponding to the left eye, the right eye, the nose, and the mouth) in three feature channels are respectively obtained; edge smoothing is respectively performed on the initial local feature maps in these feature channels, to obtain target local feature maps in the three feature channels; the global feature maps and the target local feature maps in the feature channels are spliced, to obtain spliced feature maps 1001 in the three feature channels; and these spliced feature maps 1001 are superimposed in sequence and are inputted into the convolution module for convolution, to obtain a target image.

In the above embodiment, a global feature map and a local feature map are spliced and convolved based on a feature channel, so that global features and local features in a plurality of feature channels can be fully fused, an obtained target image more comprehensively reflects features of an input image, and a more accurate target three-dimensional model is finally obtained.

In an embodiment, the global feature map and the target local feature map are respectively spliced and convolved based on the texture and the shape, to obtain the corresponding target texture image and target shape image.

In an embodiment, for the texture, the splicing the global texture feature map and the local texture feature map, and convolving a spliced feature map to integrate a global texture feature and a local texture feature, to obtain the target texture image includes: splicing the global texture feature map and the local texture feature map in each feature channel, and convolving a feature map spliced in each feature channel to integrate the global texture feature and the local texture feature, to obtain the target texture image. In the above embodiment, a global texture feature map and a local texture feature map are spliced according to channel dimensionality, and a spliced feature map is convolved, thereby fully fusing global texture features and local texture features in a plurality of feature channels, so that a comprehensively accurate target texture image can be obtained.

In an embodiment, for the shape, the global feature map and the target local feature map each correspond to at least one feature channel; and the splicing the global shape feature map and the local shape feature map, and convolving a spliced feature map to integrate a global shape feature and a local shape feature, to obtain the target shape image includes: splicing the global shape feature map and the local shape feature map in each feature channel, and convolving a feature map spliced in each feature channel to integrate the global shape feature and the local shape feature, to obtain the target shape image. In the above embodiment, a global shape feature map and a local shape feature map are spliced according to channel dimensionality, and a spliced feature map is convolved, thereby fully fusing global shape features and local shape features in a plurality of feature channels, so that a comprehensively accurate target shape image can be obtained.

In an embodiment, the image feature coefficient may be obtained by an autoencoder. The autoencoder is a neural network aiming to copy an input to an output. Specifically, the autoencoder may be a convolutional autoencoder. The convolutional autoencoder replaces a fully connected layer with a convolutional layer, downsamples input features to provide potential representation in smaller dimensionality, and forces the autoencoder to learn a compressed version of the input features, thereby obtaining a coefficient characterizing the image features.

In an embodiment, the obtaining an image feature coefficient of an input image includes: performing depthwise convolution on the input image by a convolutional autoencoder; and obtaining, according to a depthwise convolution result, a texture feature coefficient and a shape feature coefficient of the input image as the image feature coefficient.

Figures 11, 12:
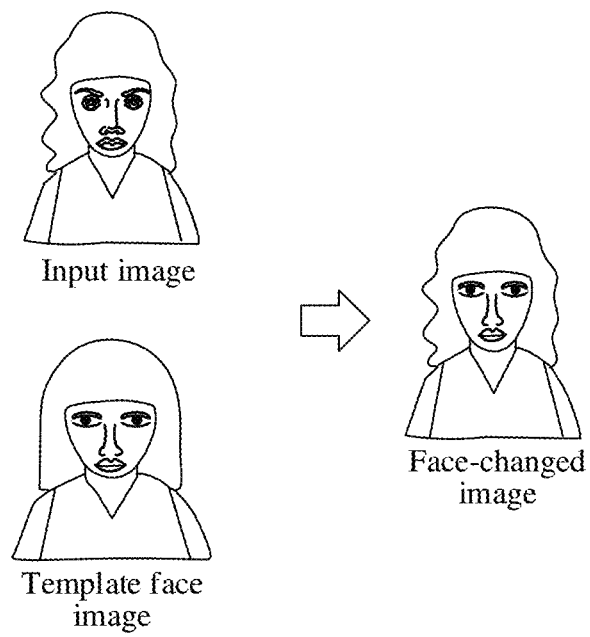
FIG. 11 is a schematic structural diagram of a convolutional autoencoder according to an embodiment.
FIG. 12 is a schematic diagram of a process of obtaining a face-changed image according to an embodiment.

A structure of the convolutional autoencoder may be shown in FIG. 11. The convolutional autoencoder is formed by a plurality of convolutional layers, and these convolutional layers perform depthwise convolution on the input image, to downsample and perform depthwise analysis on features of the input image, and then obtain a texture feature coefficient $f_a$ and a shape feature coefficient $f_s$, as the image feature coefficient according to the depthwise convolution result.

Specifically, in an embodiment, the convolutional autoencoder includes a decoder; and the performing depthwise convolution on the input image by a convolutional autoencoder, and obtaining the image feature coefficient according to a depthwise convolution result includes: performing depthwise convolution on the input image by the convolutional autoencoder; and obtaining, by the decoder according to the depthwise convolution result, the texture feature coefficient and the shape feature coefficient of the input image as the image feature coefficient.

The convolutional autoencoder outputs each convolutional layer through the decoder. An output size shown on the right side of FIG. 11 is a size of the result outputted by the decoder. A 53rd convolutional layer may obtain a two-dimensional output result, namely, an output of $7 \times 7 \times (f_s+f_a+64)$ on the right. Avgpooling is then performed, so that values of $f_s$ and $f_a$ can be obtained, that is, the texture feature coefficient and the shape feature coefficient are obtained.

In the above embodiment, an image feature coefficient is obtained by an autoencoder, image features of an input image can be fully mined by depthwise convolution, and then an accurate image feature coefficient can be obtained, so as to obtain accurate global feature map and local feature map.

In an embodiment, feature analysis and decoding of the input image may be performed by a local detail enhancement module. The local detail enhancement module may include a global decoder and a local decoder, and the global feature map and the initial local feature map may be obtained through the two decoders. In an embodiment, the respectively obtaining, according to the image feature coefficient, a global feature map and an initial local feature map based on a texture and a shape of the input image includes: performing, by a deconvolution layer in a global decoder according to the image feature coefficient, feature decoding on the input image, to obtain the global feature map; and performing, by a deconvolution layer in a local decoder according to the image feature coefficient, feature decoding on the input image, to obtain the initial local feature map.

The global decoder and the local decoder each may be formed by at least one deconvolution layer, and sizes of convolution kernels of deconvolution layers may be the same or different. In addition, sizes of global feature maps of feature channels may be the same, while sizes of initial local feature maps of different parts may be the same or different.

In the above embodiment, a global decoder decodes an input image to obtain a global feature map, and a local decoder decodes the input image to obtain an initial local feature map, that is, the two branches, the global decoder and the local decoder, respectively obtain an entire feature and a local feature of the input image, and a target image is obtained based on integration of the global feature and the local feature, so that the target image can restore information of the input image as much as possible, so as to subsequently realize the reliable image reconstruction effect based on the target image.

In an embodiment, the local decoder includes a facial key part decoder; and the performing, by a deconvolution layer in a local decoder according to the image feature coefficient, feature decoding on the input image, to obtain the initial local feature map includes: performing, by a deconvolution layer in the facial key part decoder according to the image feature coefficient, feature decoding on the input image, and determining a key part feature map obtained by decoding as the initial local feature map.

There may be more than one facial key part decoder, and at the same time, each facial key part may correspond to at least one decoder, such as, a left eye decoder, a right eye decoder, a nose decoder, and a mouth decoder. These facial key part decoders respectively perform feature decoding on the input image and obtain corresponding initial local feature maps.

In some embodiments, these facial key part decoders may be obtained by pre-training images corresponding to the eyes, the nose, and the mouth.

In the above embodiment, a facial key part decoder targetedly performs feature decoding, to obtain an initial local feature map with a clear local feature.

In an embodiment, the facial key part decoder includes a left eye decoder, a right eye decoder, a nose decoder, and a mouth decoder; and the performing, by a deconvolution layer in the facial key part decoder according to the image feature coefficient, feature decoding on the input image, and determining a key part feature map obtained by decoding as the initial local feature map includes: performing, by a deconvolution layer in the left eye decoder according to the image feature coefficient, feature decoding on the input image, to obtain a left eye feature map; performing, by a deconvolution layer in the right eye decoder according to the image feature coefficient, feature decoding on the input image, to obtain a right eye feature map; performing, by a deconvolution layer in the nose decoder according to the image feature coefficient, feature decoding on the input image, to obtain a nose feature map; performing, by a deconvolution layer in the mouth decoder according to the image feature coefficient, feature decoding on the input image, to obtain a mouth feature map; and determining the left eye feature map, the right eye feature map, the nose feature map, and the mouth feature map as the initial local feature map.

In an embodiment, the respectively obtaining, according to the image feature coefficient, a global feature map and an initial local feature map based on a texture and a shape of the input image includes: performing, by a deconvolution layer in a global decoder according to the texture feature coefficient and the shape feature coefficient, feature decoding on the input image, to obtain the global texture feature map and the global shape feature map; and performing, by a deconvolution layer in a local decoder according to the texture feature coefficient and the shape feature coefficient, feature decoding on the input image, to obtain the initial local texture feature map and the initial local shape feature map.

In an embodiment, edge smoothing may be performed on the initial local texture feature map and the initial local shape feature map, to obtain a local texture feature map and a local shape feature map; and the obtained local texture feature map and local shape feature map are spliced with corresponding global feature maps, to obtain the corresponding target texture image and target shape image.

In an embodiment, a global decoder $D_g$ is formed by 13 deconvolution layers, a size of a convolution kernel of each deconvolution layer is 3*3, and an output of the global decoder may be a global feature map G with c' *h' *w', where c' is a quantity of feature channels, h' and w' are respectively a height and a width of the global feature map, h'*w' may be 192*224, and a texture coefficient $f_a$ and a shape coefficient $f_s$ are used as an input of the global decoder, to obtain a global texture feature map $T_G$ and a global shape feature map $S_G$.

A local decoder $D_l$ is formed by 4 local decoding modules $D_l^{nose}$, $D_l^{mouth}$ $D_l^{lefteye}$, and $D_l^{righteye}$, to decode nose, mouth, left eye, and right eye regions. Each local decoding module includes 10 deconvolution layers. Outputs corresponding to $D_l^{nose}$, $D_l^{mouth}$, $D_l^{lefteye}$, and $D_l^{righteye}$ are respectively $L_{nose}$, $L_{mouth}$, $L_{lefteye}$, and $L_{righteye}$, and corresponding output sizes thereof are respectively c' *$h_{nose}$*$w_{nose}$, c' *$h_{mouth}$*$w_{mouth}$, c' *$h_{lefteye}$*$w_{lefteye}$, and c'*$h_{righteyere}$*$w_{righteye}$, $h_{nose}$, $h_{mouth}$, $h_{lefteye}$, and $h_{righteye}$ respectively represent heights of nose, mouth, left eye, and right eye feature maps, and $w_{nose}$, $w_{mouth}$, $w_{lefteye}$, and $w_{righteye}$ respectively represent widths of the nose, mouth, left eye, and right eye feature maps.

Outputs of the global decoder and the local decoder are respectively shown in the below table:

| Decoding module | Output | Output size |
|---|---|---|
| $D_g$ | G | c' * h' * w' |
| $D_l^{nose}$ | $L_{nose}$ | c' * $h_{nose}$ * $w_{nose}$ |
| $D_l^{mouth}$ | $L_{mouth}$ | c' * $h_{mouth}$ * $w_{mouth}$ |
| $D_l^{lefteye}$ | $L_{lefteye}$ | c' * $h_{lefteye}$ * $w_{lefteye}$ |
| $D_l^{righteye}$ | $L_{righteye}$ | c' * $h_{righteyere}$ * $w_{righteye}$ |

In the above embodiment, a global feature map is obtained by decoding of a global decoder, a facial key part feature map is obtained by decoding of a facial key part decoder, and then the feature maps are spliced and convolved to obtain a target image. In this way, not only the global feature map reflecting an entire facial feature of an input image can be obtained, but the facial key part feature map reflecting local information can be targetedly obtained, so that the obtained target image is sufficiently comprehensive and accurate.

In an embodiment, the target three-dimensional model generated in this embodiment of the present invention may provide paired training data for face fusion (face changing application) research. After face changing is performed between a fusion image (a user face) and a template image, a result image is obtained, and 2D feature points of the face in the result image are the paired training data. Each frame in the template image and the user face may be respectively modeled, then a pose and an expression of each frame in the template image may be transferred to the user face, and a three-dimensional model corresponding to each frame after face changing may be obtained, thereby obtaining the paired training data from a 2D image corresponding to the three-dimensional model, so as to subsequently train a face changing model.

The face changing model may be a network neural model based on deep learning, which is a model that can replace part features of a face with other facial features. For example, two face images A and B are inputted into the face changing model, and the face changing model obtains a global feature from A and a local feature from B, and then performs three-dimensional reconstruction model according to these features, to obtain a face model C including the global feature of A and the local feature of B. Because the local feature includes more detailed information of a facial organ and can more obviously characterize a facial feature, it may be understood that the face B is replaced on the face A in this case.

Specifically, in an embodiment, the input image is a face image; and after the performing three-dimensional model reconstruction according to the target texture image and the target shape image, to obtain a target three-dimensional model, the method further includes: obtaining a global feature point of a two-dimensional image corresponding to the target three-dimensional model, to obtain a target feature point; obtaining a template three-dimensional model; obtaining a local feature point of a two-dimensional image corresponding to the template three-dimensional model, to obtain a template feature point; and inputting the target feature point and the template feature point used as paired data into a face changing model, to cause the face changing model to output a face-changed three-dimensional model, where the face-changed three-dimensional model includes a global feature of the target three-dimensional model and a local feature of the template three-dimensional model.

The template three-dimensional model may be obtained according to a template face image. Specifically, the template face image is inputted into a three-dimensional reconstruction model, and a three-dimensional model outputted by the three-dimensional reconstruction model is the template three-dimensional model. Because the template three-dimensional model is generated by the three-dimensional reconstruction model, the three-dimensional reconstruction model can directly and quickly output the local feature point of the template three-dimensional model in this manner. In some embodiments, a pre-configured template three-dimensional model may be alternatively obtained, and feature point extraction is performed on the template three-dimensional model, to obtain the local feature point of the template three-dimensional model.

In the above embodiment, a local feature point is obtained from a template three-dimensional model, a global feature point is obtained from a target three-dimensional model, these two feature points are inputted into a face changing model in pair, and a face-changed three-dimensional model is obtained by the face changing model, thereby accurately realizing face changing.

In an embodiment, image rendering may be performed on the face-changed three-dimensional model, to obtain a face-changed image. FIG. 12 is a schematic diagram of a process of obtaining a face-changed image according to an embodiment. As shown in FIG. 12, the face-changed image on the right is obtained after integration and rendering of the input image and the template face image. The face-changed image has a pose and a contour of the input image, and also has shapes of facial parts and an expression of the template face image, so that the "face changing" effect is realized.

In an embodiment, the obtaining a template three-dimensional model includes: obtaining a preset template face image; obtaining a template global feature map and an initial template local feature map based on the texture and the shape of the template face image; performing edge smoothing on the initial template local feature map, to obtain a target template local feature map; respectively splicing the template global feature map and the target template local feature map based on the texture and the shape, to obtain a template facial texture image and a template facial shape image; and performing three-dimensional model reconstruction according to the template facial texture image and the template facial shape image, to obtain the template three-dimensional model.

In the above embodiment, a template face image is processed by a three-dimensional reconstruction model, and edge smoothing is performed on an initial template local feature map, so that a template facial texture image and a template facial shape image with smooth and continuous edges can be obtained. In this way, the distortion of a reconstructed template three-dimensional model can be effectively reduced, and normal running of a face changing application can be ensured, thereby obtaining a reliable face-changed three-dimensional model.

The method for reconstructing a three-dimensional model provided in this application is applicable to various three-dimensional reconstruction processing scenarios, for example, applicable to image processing software, model reconstruction software, photoshop (PS) software, and three-dimensional animation processing software (such as animation face pinching software).

Figure 13:
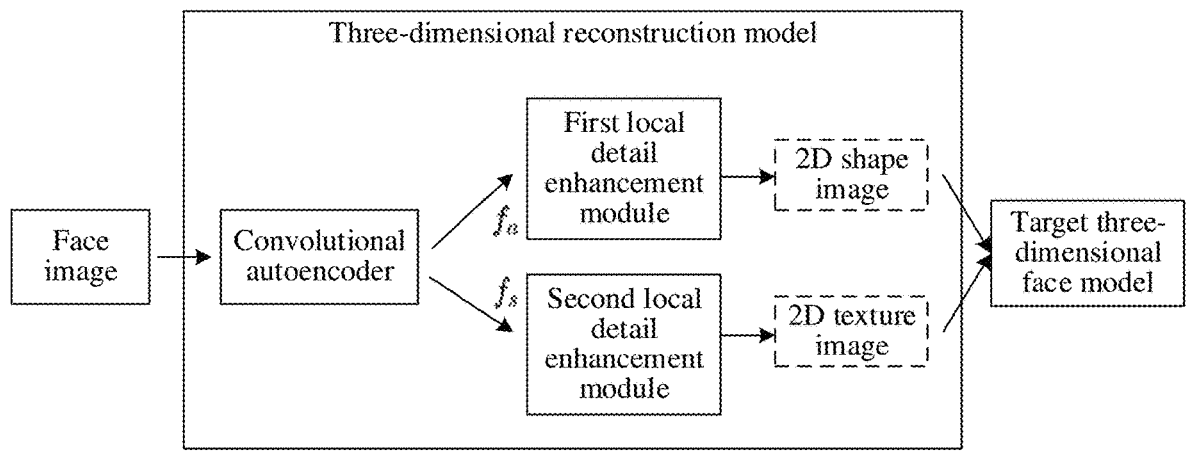
FIG. 13 is a schematic flowchart of a method for reconstructing a three-dimensional model according to another embodiment.

This application further provides an application scenario, and the above method for reconstructing a three-dimensional model is applied to the application scenario. Specifically, FIG. 13 is a schematic flowchart of a method for reconstructing a three-dimensional model according to another embodiment. Referring to FIG. 13, application of the method for reconstructing a three-dimensional model in the application scenario is as follows:

Input a to-be-processed face image with 224*224 into three-dimensional reconstruction software (where the three-dimensional reconstruction software is equipped with a three-dimensional reconstruction model based on deep learning) of a terminal, to trigger the three-dimensional reconstruction software to perform the following processing on the inputted face image, to reconstruct a target three-dimensional face model:

1. Generate a texture coefficient $f_a$ and a shape coefficient $f_s$ corresponding to the face image by a convolutional autoencoder.

2. Input $f_a$ and $f_s$ into a first local detail enhancement module and a second local detail enhancement module with a same structure. The first local detail enhancement module is configured to output a 2D shape image, and the second local detail enhancement module is configured to output a 2D texture image. Specific processing procedures of the two local detail enhancement modules refer to step 3 and step 4.

3. Construct a decoder D formed by one global decoder $D_g$ and one local decoder $D_l$ in a local detail enhancement module.

The first local detail enhancement module is used as an example for description below (an implementation process of the second local detail enhancement module is the same, and details are not described herein again):

The global decoder $D_g$ is formed by 13 deconvolution layers, and outputs a global shape feature map $S_G$.

The local decoder $D_l$ is formed by 4 local decoding modules: $D_l^{nose}$, $D_l^{mouth}$, $D_l^{lefteye}$, and $D_l^{righteye}$, to decode nose, mouth, left eye, and right eye regions. Each local decoding module includes 10 deconvolution layers. $D_l^{nose}$, $D_l^{mouth}$, $D_l^{lefteye}$, and $D_l^{righteye}$ correspond to an initial local feature map $L_i$.

A gradient smooth feature map $f_i$ is set, and $f_i$ has a same size as the initial local feature map $L_i$. Feature values of pixels in the gradient smooth feature map are set as follows:

$$f_i = \begin{cases} 1, & \lambda_i < h < h_i - \lambda_i, \lambda_i < w < w_i - \lambda_i \\ (k+1) * \dfrac{1}{\lambda_i + 1}, & \text{other } (h, w) \end{cases}$$

After the gradient smooth feature map is generated, the feature values of the pixels in the gradient smooth feature map are multiplied by feature values of corresponding pixels in the initial local feature map, to obtain target local feature maps with gradient edges corresponding to four parts. These target local feature maps are merged, to obtain a facial organ shape feature map $S_L$.

A global texture feature map $T_G$ and a facial organ texture feature map $T_L$ are obtained by the second local detail enhancement module in the same manner.

4. After the facial organ texture feature map $T_L$ and the global texture feature map $T_G$ are spliced in channel dimensionality, the first local detail enhancement module outputs a 2D texture image $T_{2D}$ through a convolutional layer. Similarly, after the facial organ shape feature map $S_L$ and the global shape feature map $S_G$ are spliced in channel dimensionality, the second local detail enhancement module outputs a 2D shape image $S_{2D}$ through a convolutional layer.

5. Perform three-dimensional model reconstruction according to the 2D texture image $T_{2D}$ and the 2D shape image $S_{2D}$, to obtain the target three-dimensional face model.

As shown in FIG. 13, after one face image is inputted, the three-dimensional reconstruction software on the terminal performs reconstruction of a three-dimensional face model, to finally obtain the target three-dimensional face model. It can be seen from the analysis of the target three-dimensional face model, the three-dimensional face model outputted in the above embodiment is complete and continuous, and there is no problem of image distortion.

Figure 14:
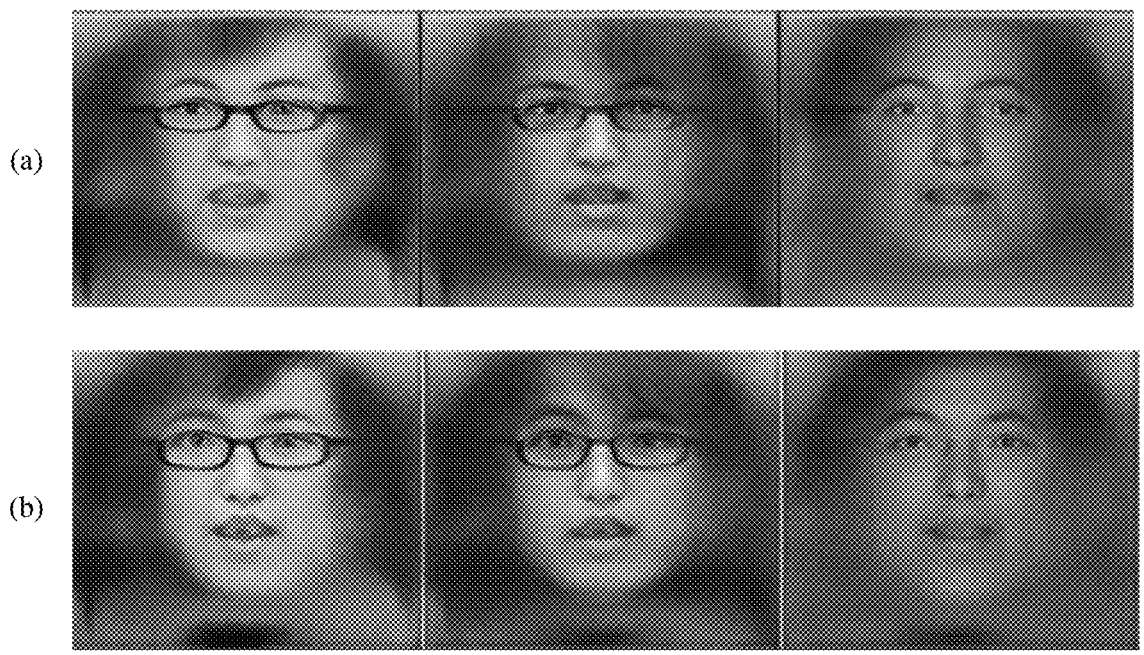
FIG. 14 is a comparison diagram of 2D texture images according to an embodiment.
Figure 15:
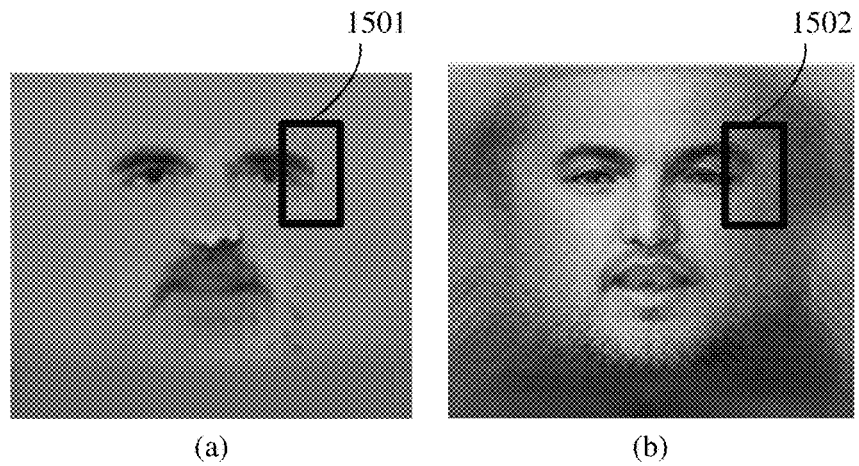
FIG. 15 is a comparison diagram of edge effects of 2D texture images according to an embodiment.

Specifically, for processing effects on image textures, FIG. 14 is a comparison diagram of 2D texture images obtained by the conventional technology and an embodiment of the present invention. FIG. 14(a) shows three 2D texture images obtained by the conventional technology, and each face texture in FIG. 14(a) has distortion of a certain degree. FIG. 14(b) shows three 2D texture images obtained in this embodiment of the present invention (where, in two rows of images a/b, two texture images corresponding to top and bottom are obtained by inputting a same input image), and face textures in FIG. 14(b) are clear and there is no distortion problem. Next, edge processing effects of the texture images are compared in detail. FIG. 15 is a comparison diagram of edge effects of 2D texture images obtained by the conventional technology and an embodiment of the present invention. FIG. 15(a) shows a 2D texture image obtained by the conventional technology, and an eye edge region 1501 in FIG. 15(a) has obvious separation. FIG. 15(b) shows a 2D texture image obtained in this embodiment of the present invention, and an edge of an eye edge region 1502 in FIG. 15(b) transitions smoothly. Positions of blocks (including the eye edge regions 1501 and 1502) in FIG. 15 are comparison between an abrupt edge and a smooth edge. It can be seen from the comparison between FIG. 14 and FIG. 15 that, compared with the texture image generated by the conventional technology, edges of the 2D texture image generated in this embodiment of the present invention are smoother, the discontinuity caused by convolution is greatly reduced, and the texture image is closer to an original skin color.

Figure 16:
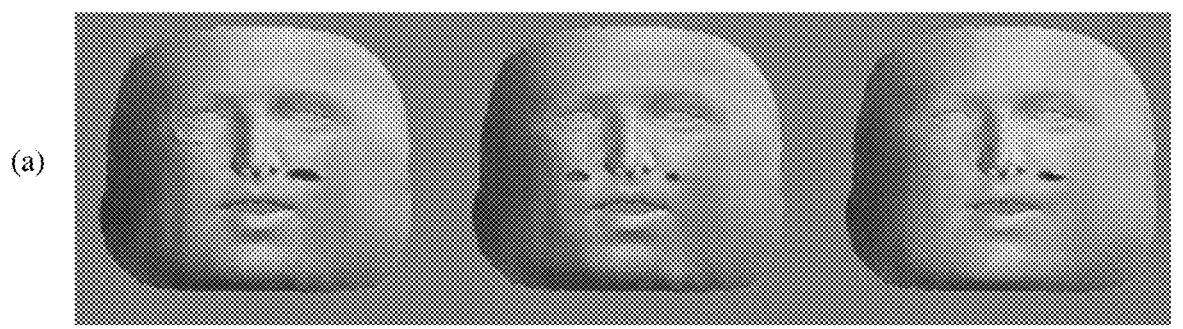
FIG. 16 is a comparison diagram of 2D shape images according to an embodiment.
Figure 16:
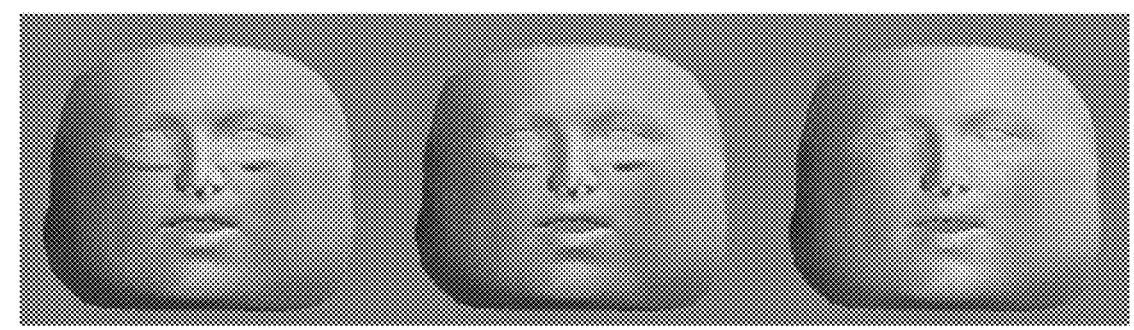

For processing effects on image shapes, FIG. 16 is a comparison diagram of 2D shape images obtained by the conventional technology and an embodiment of the present invention. FIG. 16(a) shows three 2D shape images obtained by the conventional technology, and three mouth edge regions in FIG. 16(a) each has distortion of a certain degree, that is, edges are discontinuous. FIG. 16(b) shows three 2D shape images obtained in this embodiment of the present invention (where, in two rows of images a/b, two shape images corresponding to top and bottom are obtained by inputting a same input image), and face regions in FIG. 16(b) are continuous and transition more smoothly.

It can be seen from the analysis and comparison results of the above images that the three-dimensional reconstruction software on the terminal properly resolves the distortion problem of the 2D texture images and 2D shape images through the method for reconstructing a three-dimensional model provided in this embodiment of the present invention, and can output a good three-dimensional reconstruction face model.

In an embodiment, a method for training a three-dimensional reconstruction model is further provided. An example in which the method is applied to a computer device is used for description in this embodiment. The computer device may be the terminal 102 or the server 104 in FIG. 1.

Figure 17:
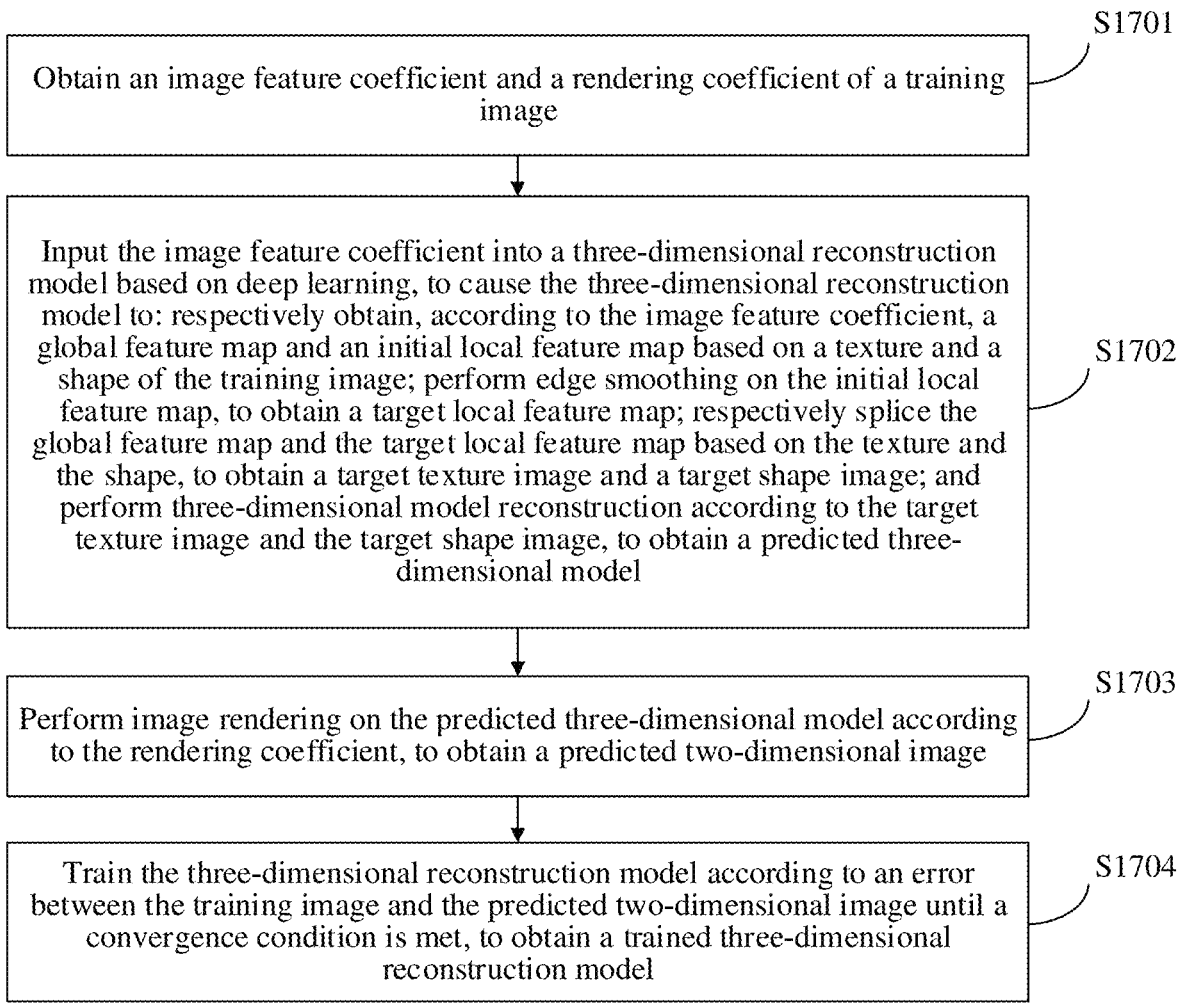
FIG. 17 is a schematic flowchart of a method for training a three-dimensional reconstruction model according to an embodiment.

Specifically, FIG. 17 is a schematic flowchart of a method for training a three-dimensional reconstruction model according to an embodiment. As shown in FIG. 17, the method includes the following steps:

S1701. Obtain an image feature coefficient and a rendering coefficient of a training image.

The training image may be an image including various types of objects, and a specific implementation may refer to the input image in the foregoing embodiments.

The rendering coefficient may be a coefficient that can affect an image rendering process, and may be an illumination coefficient, a warping coefficient, and the like. By using a face as an example, the illumination coefficient may be a coefficient corresponding to illumination intensity, illumination angle, and the like, and the warping coefficient may be a coefficient corresponding to a pitch angle of the head, a side face angle, and the like.

S1702. Input the image feature coefficient into a three-dimensional reconstruction model based on deep learning, to cause the three-dimensional reconstruction model to: respectively obtain, according to the image feature coefficient, a global feature map and an initial local feature map based on a texture and a shape of the training image; perform edge smoothing on the initial local feature map, to obtain a target local feature map; respectively splice the global feature map and the target local feature map based on the texture and the shape, to obtain a target texture image and a target shape image; and perform three-dimensional model reconstruction according to the target texture image and the target shape image, to obtain a predicted three-dimensional model.

The three-dimensional reconstruction model may be a neural network model based on deep learning.

A specific implementation process that the three-dimensional reconstruction model obtains the predicted three-dimensional model may refer to the embodiments of the foregoing method for reconstructing a three-dimensional model. Details are not described herein again.

S1703. Perform image rendering on the predicted three-dimensional model according to the rendering coefficient, to obtain a predicted two-dimensional image.

Image rendering is a process of adjusting parameters such as light, a color, and an angle of an image. In some cases, the rendering may also be a process of adjusting parameters such as light, the color, and the angle of the image and subsequently performing two-dimensional conversion, and a two-dimensional image is directly obtained after rendering.

In an embodiment, an implementation process of S1703 may include: adjusting an illumination direction, a pitch angle, and the like of the predicted three-dimensional image, performing two-dimensional conversion on the adjusted predicted three-dimensional image, and using an obtained two-dimensional image as the predicted two-dimensional image. Specifically, the rendering may be implemented by a non-linear rendering method and the like.

S1704. Train the three-dimensional reconstruction model according to an error between the training image and the predicted two-dimensional image until a convergence condition is met, to obtain a trained three-dimensional reconstruction model.

The predicted two-dimensional image is obtained by performing image rendering on the predicted three-dimensional model, and has rendering information such as illumination, colors, and angles of objects (people, an animal, buildings, and the like in the training image) in the training image. Therefore, the error between the predicted two-dimensional image and the training image carries the rendering information of the objects. Based on this, the three-dimensional reconstruction model obtained by training can reliably reconstruct the inputted image, to obtain the target three-dimensional model carrying the rendering information.

In the above embodiment, a predicted three-dimensional model without a distortion problem can be obtained as much as possible through a three-dimensional reconstruction model, and a predicted two-dimensional image is obtained by performing image rendering on the predicted three-dimensional model. The predicted two-dimensional image is reconstructed according to a training image, and can basically restore shape features of the training image. Based on this, the three-dimensional reconstruction model is trained according to an error between the predicted two-dimensional image and the training image, so that an accuracy and reliable three-dimensional reconstruction model can be obtained by training.

In an embodiment, the training the three-dimensional reconstruction model on the according to an error between the training image and the predicted two-dimensional image includes: constructing a loss function of the three-dimensional reconstruction model according to the error; performing gradient descent on the loss function; and adjusting a model parameter of the three-dimensional reconstruction model according to a gradient descent result.

Specifically, there may be a plurality of training images and predicted two-dimensional images. The loss function of the three-dimensional reconstruction model may be constructed according to errors between these training images and these predicted two-dimensional images, and then the loss function is minimized by a gradient descent method to determine a model parameter corresponding to a minimum value of the loss function. A three-dimensional reconstruction model corresponding to the model parameter is the three-dimensional reconstruction model after adjustment.

In the above embodiment, a loss function of a three-dimensional reconstruction model is processed by a gradient descent method, so that a minimum value of the loss function can be quickly and accurately obtained, and a model parameter of the three-dimensional reconstruction model is adjusted, thereby training the three-dimensional reconstruction model. When the minimum value of the loss function is small enough, it may be considered that the three-dimensional reconstruction model is good enough. In this case, it may be considered that the convergence condition is met, and the corresponding three-dimensional reconstruction model is the trained three-dimensional reconstruction model.

In an embodiment, the obtaining an image feature coefficient and a rendering coefficient of a training image includes: performing depthwise convolution on the training image by a convolutional autoencoder, where the convolutional autoencoder includes a decoder and an encoder; obtaining, by the decoder according to a depthwise convolution result, a texture feature coefficient and a shape feature coefficient of the training image as the image feature coefficient; and obtaining, by the encoder according to the depthwise convolution result, a warping coefficient and an illumination coefficient of the training image as the rendering coefficient.

The rendering coefficient includes a warping coefficient m and an illumination coefficient S.

In an embodiment, the convolutional autoencoder includes an encoder; and the obtaining, according to a depthwise convolution result, the image feature coefficient and the rendering coefficient includes: obtaining, by the encoder according to the depthwise convolution result, a warping coefficient and an illumination coefficient of the training image as the rendering coefficient.

A structure of the convolutional autoencoder may be shown in FIG. 11. The convolutional autoencoder may obtain output information of a previous convolutional layer through the encoder for convolution. A filter/step number in the middle of FIG. 11 shows a structure of the encoder. After avgpooling is performed on a convolution result, the encoder may output values of m and S, that is, the warping coefficient and the illumination coefficient are obtained.

In some embodiments, the convolutional autoencoder may also be an internal component of the three-dimensional reconstruction model. That is, the convolutional autoencoder in the three-dimensional reconstruction model obtains the image feature coefficient and the rendering coefficient.

In the above embodiment, an image feature coefficient and a rendering coefficient are obtained by a convolutional autoencoder, so that image features of a training image can be fully mined by depthwise convolution, and accurate image feature coefficient and rendering coefficient can be obtained by a method based on deep learning. In this way, reliable running of subsequent programs can be ensured, and an accurate target three-dimensional model is obtained.

Figure 18:
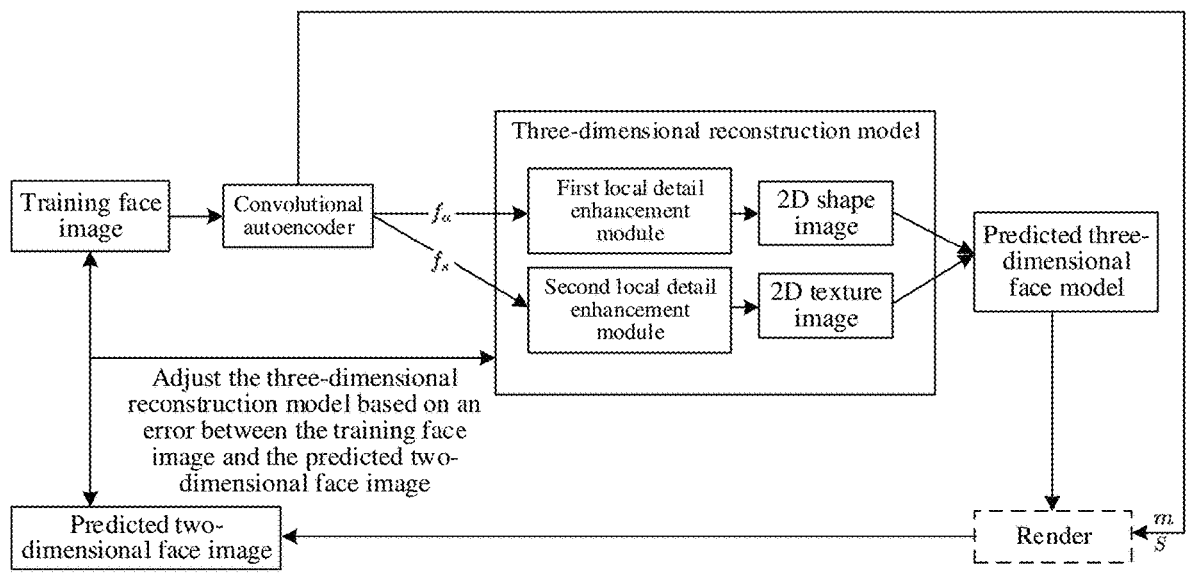
FIG. 18 is a schematic flowchart of a method for training a three-dimensional reconstruction model according to another embodiment.

In an embodiment, a method for training a three-dimensional reconstruction model is provided. An example in which the method is applied to the terminal in FIG. 1 is used for description in this embodiment. An implementation process thereof is shown in FIG. 18. FIG. 18 is a schematic flowchart of a method for training a three-dimensional reconstruction model according to another embodiment. A specific implementation process is as follows:

First, the terminal obtains a training face image, and generates a texture feature coefficient $f_s$, a shape feature coefficient $f_a$, a warping coefficient m, and an illumination coefficient S of the training face image through a convolutional autoencoder.

Second, the terminal inputs $f_a$ and $f_s$ into a three-dimensional reconstruction model, where the three-dimensional reconstruction model includes a first local detail enhancement module and a second local detail enhancement module with a same structure, and a 2D shape image and a 2D texture image are respectively obtained through the first local detail enhancement module and the second local detail enhancement module. The three-dimensional reconstruction model generates a predicted three-dimensional face model according to the 2D shape image and the 2D texture image.

Third, the terminal triggers a rendering module to render the predicted three-dimensional face model according to the warping coefficient m and the illumination coefficient S, to a predicted two-dimensional face image.

Fourth, the terminal adjusts the three-dimensional reconstruction model based on an error between the training face image and the predicted two-dimensional face image. When a convergence condition is met, a trained three-dimensional reconstruction model is obtained, and the model can reconstruct a three-dimensional model based on an inputted two-dimensional image.

In the above embodiment, a predicted three-dimensional model is obtained through a three-dimensional reconstruction model, and a predicted two-dimensional image is obtained by performing image rendering on the predicted three-dimensional model. The predicted two-dimensional image is reconstructed according to a training image, and can basically restore shape features of the training image. Based on this, the predicted two-dimensional image corresponding to the predicted three-dimensional model and the inputted training image are compared, and a comparison result can play a role in feeding back the reconstruction effect of the three-dimensional reconstruction model. The three-dimensional reconstruction model is trained according to the comparison result, so that an accuracy and reliable three-dimensional reconstruction model can be obtained by training.

This application further provides an application scenario, and the method for training a three-dimensional reconstruction model and the method for reconstructing a three-dimensional model described above are applied to the application scenario. Specifically, application of these methods in the application scenario is as follows:

A terminal receives a plurality of training face images, and inputs these training face images into model training software. The model training software obtains a texture feature coefficient $f_{sX}$, a shape feature coefficient $f_{aX}$, a warping coefficient $m_X$, and an illumination coefficient $S_X$ of each of the training face images. The model training software inputs the texture feature coefficient $f_{sX}$ and the shape feature coefficient $f_{aX}$ into a three-dimensional reconstruction model. The three-dimensional reconstruction model respectively obtains a global texture feature map $T_{GX}$, a global shape feature map $S_{GX}$, a local texture feature map $T_{LXO}$, and a local shape feature map $S_{LXO}$ of each training face image according to the texture feature coefficient $f_{sX}$ and the shape feature coefficient $f_{aX}$; performs edge smoothing on the local texture feature map $T_{LXO}$ and the local shape feature map $S_{LXO}$, to obtain a target local texture feature map $T_{LX}$ and a target local shape feature map $S_{LX}$; splices the global texture feature map $T_{GX}$ and the target local texture feature map $T_{LX}$, to obtain a target texture image $T_X$, and splices the global shape feature map $S_{GX}$ and the target local shape feature map $S_{LX}$, to obtain a target shape image $S_X$; and performs three-dimensional model reconstruction according to the target texture image $T_X$ and the target shape image $S_X$, to obtain a predicted three-dimensional face model. The model training software performs image rendering on the predicted three-dimensional face model according to the warping coefficient $m_X$ and the illumination coefficient $S_X$, to a predicted two-dimensional face image; and constructs a loss function according to an error between each training face image and the predicted two-dimensional face image, runs a gradient descent algorithm for the loss function, and obtains a trained three-dimensional reconstruction model when a result of the gradient descent algorithm meets a convergence condition.

Then, the model training software may output the trained three-dimensional reconstruction model into three-dimensional reconstruction software, so that the three-dimensional reconstruction software performs the following steps through the trained three-dimensional reconstruction model when receiving an input face image: respectively obtaining a global texture feature map $T_{GY}$, a global shape feature map $S_{GY}$, a local texture feature map $T_{LYO}$, and a local shape feature map $S_{LYO}$ of the input face image according to a texture feature coefficient $f_{sY}$ and a shape feature coefficient $f_{aY}$ of the input face image; performing edge smoothing on the local texture feature map $T_{LYO}$ and the local shape feature map $S_{LYO}$, to obtain a target local texture feature map $T_{LY}$ and a target local shape feature map $S_{LY}$; splicing the global texture feature map $T_{GY}$ and the target local texture feature map $T_{LY}$, to obtain a target texture image $T_Y$, and splicing the global shape feature map $S_{GY}$ and the target local shape feature map $S_{LY}$, to obtain a target shape image $S_Y$; and performing three-dimensional model reconstruction according to the target texture image $T_Y$ and the target shape image $S_Y$, to obtain a target three-dimensional face model. The three-dimensional reconstruction software converts the target three-dimensional face model into a form of an image and displays the image on a display screen.

In the above method provided in this embodiment of the present invention, training of a three-dimensional model and reconstruction of a three-dimensional model can be implemented in a terminal, and a three-dimensional face reconstructed by a three-dimensional reconstruction model can effectively suppress image distortion, thereby realizing a reliable face model reconstruction effect.

It is to be understood that although the steps in the flowchart are sequentially shown according to indication of an arrow, the steps are not necessarily sequentially performed according to a sequence indicated by the arrow. Unless otherwise explicitly specified in this specification, execution of the steps is not strictly limited, and the steps may be performed in other sequences. In addition, at least some steps in the above flowcharts may include a plurality of steps or a plurality of stages, and these steps or stages are not necessarily performed at a same time instant, but may be performed at different time instants. The steps or stages are not necessarily performed in sequence, but may be performed by turn or alternately with other steps or at least part of steps or stages in other steps.

Based on the same idea as the method for reconstructing a three-dimensional model and the method for training a three-dimensional reconstruction model in the above embodiments, the present invention further provides an apparatus for reconstructing a three-dimensional model and an apparatus for training a three-dimensional reconstruction model, and these apparatuses may be respectively configured to perform the method for reconstructing a three-dimensional model and the method for training a three-dimensional reconstruction model described above. For ease of description, schematic structural diagrams of embodiments of the apparatus for reconstructing a three-dimensional model and the apparatus for training a three-dimensional reconstruction model only show parts related to the embodiments of the present invention. A person skilled in the art may understand that the structure shown in the figure does not constitute a limitation on the apparatus, and the apparatus may include more components or fewer components than those shown in the figure, or combine some components, or have different component arrangements.

Figure 19:
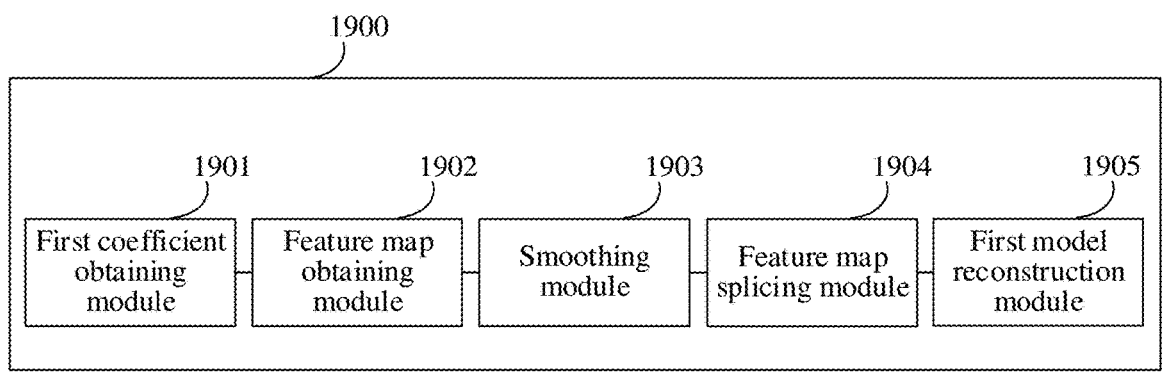
FIG. 19 is a structural block diagram of an apparatus for reconstructing a three-dimensional model according to an embodiment.

In an embodiment, as shown in FIG. 19, an apparatus 1900 for reconstructing a three-dimensional model is provided. The apparatus may use software modules or hardware modules, or become a part of a computer device by a combination of the two. The apparatus specifically includes: a first coefficient obtaining module 1901, a feature map obtaining module 1902, a smoothing module 1903, a feature map splicing module 1904, and a first model reconstruction module 1905.

The first coefficient obtaining module 1901 is configured to obtain an image feature coefficient of an input image.

The feature map obtaining module 1902 is configured to respectively obtain, according to the image feature coefficient, a global feature map and an initial local feature map based on a texture and a shape of the input image.

The smoothing module 1903 is configured to perform edge smoothing on the initial local feature map, to obtain a target local feature map.

The feature map splicing module 1904 is configured to respectively splice the global feature map and the target local feature map based on the texture and the shape, to obtain a target texture image and a target shape image.

The first model reconstruction module 1905 is configured to perform three-dimensional model reconstruction according to the target texture image and the target shape image, to obtain a target three-dimensional model.

In the above apparatus for reconstructing a three-dimensional model, edge smoothing is performed on a local feature map, so that image distortion does not easily occur, and a target three-dimensional model with smooth edges can be obtained.

In an embodiment, the smoothing module includes: a boundary obtaining sub-module, configured to obtain a boundary of the initial local feature map; a distance obtaining sub-module, configured to obtain distances between pixels in the initial local feature map and the boundary; and a first edge smoothing sub-module, configured to perform edge smoothing on the initial local feature map according to the distances, to obtain the target local feature map.

In an embodiment, the first edge smoothing sub-module includes: an edge region obtaining unit, configured to obtain an edge region of the initial local feature map according to the distances; a weight value determining unit, configured to determine feature weight values corresponding to pixels of the edge region according to the distances, to cause a feature weight value corresponding to a long-distance pixel to be greater than a feature weight value corresponding to a short-distance pixel; a feature map construction unit, configured to generate a gradient smooth feature map according to feature weight values corresponding to the pixels of the initial local feature map, where a feature weight value corresponding to a pixel located outside the edge region of the initial local feature map is a preset weight value, and feature values of pixels in the gradient smooth feature map are obtained according to the corresponding feature weight values; and a feature value multiplication unit, configured to multiply the feature values of the pixels in the gradient smooth feature map by feature values of the corresponding pixels in the initial local feature map, to obtain the target local feature map according to a multiplication result.

In an embodiment, the input image is a face image; the target local feature map includes a key part feature map corresponding to a facial key part; and the feature map splicing module includes: a padding sub-module, configured to respectively perform feature value padding on external regions of key part feature maps, to obtain padded key part feature maps with a same size as the global feature map; a merging sub-module, configured to merge the padded key part feature maps, to obtain a facial organ feature map; and a splicing sub-module, configured to respectively splice the global feature map and the facial organ feature map based on the texture and the shape, to obtain the target texture image and the target shape image.

In an embodiment, the facial key part includes at least one of a left eye, a right eye, a nose, or a mouth.

In an embodiment, the global feature map includes a global texture feature map and a global shape feature map, the target local feature map includes a local texture feature map and a local shape feature map; and the feature map splicing module includes: a texture convolution sub-module, configured to splice the global texture feature map and the local texture feature map, and convolve a spliced feature map to integrate a global texture feature and a local texture feature, to obtain the target texture image; and a shape convolution sub-module, configured to splice the global shape feature map and the local shape feature map, and convolve a spliced feature map to integrate a global shape feature and a local shape feature, to obtain the target shape image.

In an embodiment, the global feature map and the target local feature map each correspond to at least one feature channel; the texture convolution sub-module is further configured to splice the global texture feature map and the local texture feature map in each feature channel, and convolve a feature map spliced in each feature channel to integrate the global texture feature and the local texture feature, to obtain the target texture image; and the shape convolution sub-module is further configured to splice the global shape feature map and the local shape feature map in each feature channel, and convolve a feature map spliced in each feature channel to integrate the global shape feature and the local shape feature, to obtain the target shape image.

In an embodiment, the first coefficient obtaining module includes: a convolution sub-module, configured to perform depthwise convolution on the input image by a convolutional autoencoder; and a feature coefficient obtaining sub-module, configured to obtain, according to a depthwise convolution result, a texture feature coefficient and a shape feature coefficient of the input image as the image feature coefficient.

In an embodiment, the feature map obtaining module includes: a global decoding sub-module, configured to perform, by a deconvolution layer in a global decoder according to the image feature coefficient, feature decoding on the input image, to obtain the global feature map; and a local decoding sub-module, configured to perform, by a deconvolution layer in a local decoder according to the image feature coefficient, feature decoding on the input image, to obtain the initial local feature map.

In an embodiment, the local decoder includes a facial key part decoder; and the local decoding sub-module is further configured to perform, by a deconvolution layer in the facial key part decoder according to the image feature coefficient, feature decoding on the input image, and determining a key part feature map obtained by decoding as the initial local feature map.

In an embodiment, the input image is a face image; and the apparatus further includes: a target feature point obtaining module, configured to obtain a global feature point of a two-dimensional image corresponding to the target three-dimensional model, to obtain a target feature point; a template model obtaining module, configured to obtain a template three-dimensional model; a template feature point obtaining module, configured to obtain a local feature point of a two-dimensional image corresponding to the template three-dimensional model, to obtain a template feature point; and a face changing module, configured to input the target feature point and the template feature point used as paired data into a face changing model, to cause the face changing model to output a face-changed three-dimensional model, where the face-changed three-dimensional model includes a global feature of the target three-dimensional model and a local feature of the template three-dimensional model.

In an embodiment, the template model obtaining module includes: a template image obtaining sub-module, configured to obtain a preset template face image; a template feature map obtaining sub-module, configured to obtain a template global feature map and an initial template local feature map based on the texture and the shape of the template face image; a second edge smoothing sub-module, configured to perform edge smoothing on the initial template local feature map, to obtain a target template local feature map; a feature map splicing sub-module, configured to respectively splice the template global feature map and the target template local feature map based on the texture and the shape, to obtain a template facial texture image and a template facial shape image; and a template three-dimensional model reconstruction sub-module, configured to perform three-dimensional model reconstruction according to the template facial texture image and the template facial shape image, to obtain the template three-dimensional model.

For a specific limitation on the apparatus for reconstructing a three-dimensional model, refer to the limitation on the method for reconstructing a three-dimensional model described above. Details are not described herein again. The modules in the apparatus for reconstructing a three-dimensional model may be implemented entirely or partially by software, hardware, or combinations thereof. The foregoing modules may be built in or independent of a processor of a computer device in a hardware form, or may be stored in a memory of the computer device in a software form, so that the processor invokes and performs an operation corresponding to each of the foregoing modules.

Figure 20:
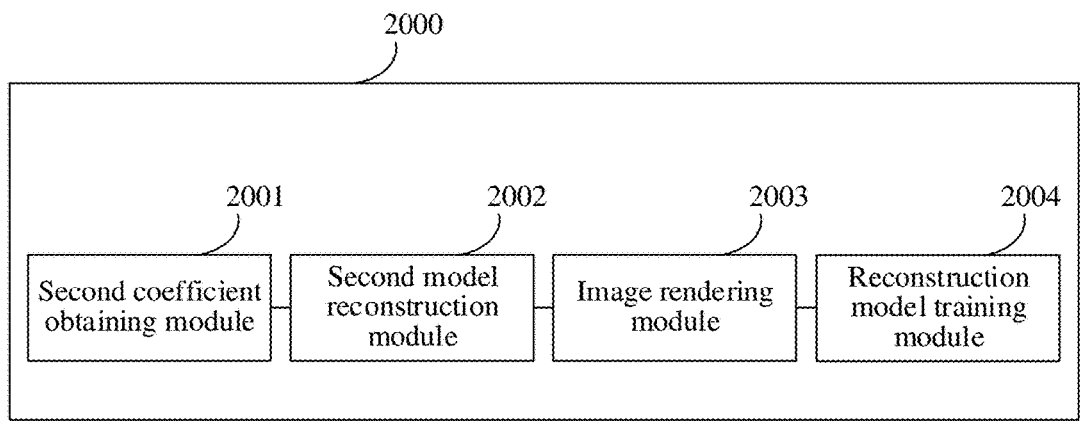
FIG. 20 is a structural block diagram of an apparatus for training a three-dimensional reconstruction model according to another embodiment.

In an embodiment, as shown in FIG. 20, an apparatus 2000 for training a three-dimensional reconstruction model is provided. The apparatus may use software modules or hardware modules, or become a part of a computer device by a combination of the two. The apparatus specifically includes: a second coefficient obtaining module 2001, a second model reconstruction module 2002, an image rendering module 2003, and a reconstruction model training module 2004.

The second coefficient obtaining module 2001 is configured to obtain an image feature coefficient and a rendering coefficient of a training image.

The second model reconstruction module 2002 is configured to input the image feature coefficient into a three-dimensional reconstruction model based on deep learning, to cause the three-dimensional reconstruction model to: respectively obtain, according to the image feature coefficient, a global feature map and an initial local feature map based on a texture and a shape of the training image; perform edge smoothing on the initial local feature map, to obtain a target local feature map; respectively splice the global feature map and the target local feature map based on the texture and the shape, to obtain a target texture image and a target shape image; and perform three-dimensional model reconstruction according to the target texture image and the target shape image, to obtain a predicted three-dimensional model.

The image rendering module 2003 is configured to perform image rendering on the predicted three-dimensional model according to the rendering coefficient, to obtain a predicted two-dimensional image.

The reconstruction model training module 2004 is configured to train the three-dimensional reconstruction model according to an error between the training image and the predicted two-dimensional image until a convergence condition is met, to obtain a trained three-dimensional reconstruction model.

In the above embodiment, a predicted three-dimensional model without a distortion problem can be obtained as much as possible through a three-dimensional reconstruction model, a predicted two-dimensional image corresponding to the predicted three-dimensional model is determined, and the three-dimensional reconstruction model is trained according to an error between the predicted two-dimensional image and a training image, so that an accurate and reliable three-dimensional reconstruction model can be obtained by training.

In an embodiment, the second coefficient obtaining module includes: a depthwise convolution sub-module, configured to perform depthwise convolution on the training image by a convolutional autoencoder, where the convolutional autoencoder includes a decoder and an encoder; an image feature coefficient obtaining sub-module, configured to obtain, by the decoder according to a depthwise convolution result, a texture feature coefficient and a shape feature coefficient of the training image as the image feature coefficient; and a rendering coefficient obtaining sub-module, configured to obtain, by the encoder according to the depthwise convolution result, a warping coefficient and an illumination coefficient of the training image as the rendering coefficient.

For a specific limitation on the apparatus for training a three-dimensional reconstruction model, refer to the limitation on the method for training a three-dimensional reconstruction model described above. Details are not described herein again. The modules in the apparatus for training a three-dimensional reconstruction model may be implemented entirely or partially by software, hardware, or combinations thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a server, and an internal structure diagram thereof may be shown in FIG. 21. The computer device includes a processor, a memory, and a network interface connected through a system bus. The processor of the computer device is configured to provide computing and control capabilities. The memory of the computer device includes a non-volatile storage medium and an internal memory. The non-volatile storage medium stores an operating system, a computer-readable instruction, and a database. The internal memory provides an environment for running of the operating system and the computer-readable instruction in the non-volatile storage medium. The database of the computer device is configured to store data such as a three-dimensional reconstruction model, a convolutional autoencoder, and a training image. The network interface of the computer device is configured to communicate with an external terminal through a network connection. The computer-readable instruction, when executed by the processor, implements a method for reconstructing a three-dimensional model and a method for training a three-dimensional reconstruction model.

In an embodiment, a computer device is provided. The computer device may be a terminal, and an internal structure diagram thereof may be shown in FIG. 22. The computer device includes a processor, a memory, a communication interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and a computer-readable instruction. The internal memory provides an environment for running of the operating system and the computer-readable instruction in the non-volatile storage medium. The communication interface of the computer device is configured to communicate with an external terminal in a wired or wireless manner, and the wireless manner may be implemented through WIFI, a carrier network, near field communication (NFC), or other technologies. The computer-readable instruction, when executed by the processor, implements a method for reconstructing a three-dimensional model and a method for training a three-dimensional reconstruction model. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 21:
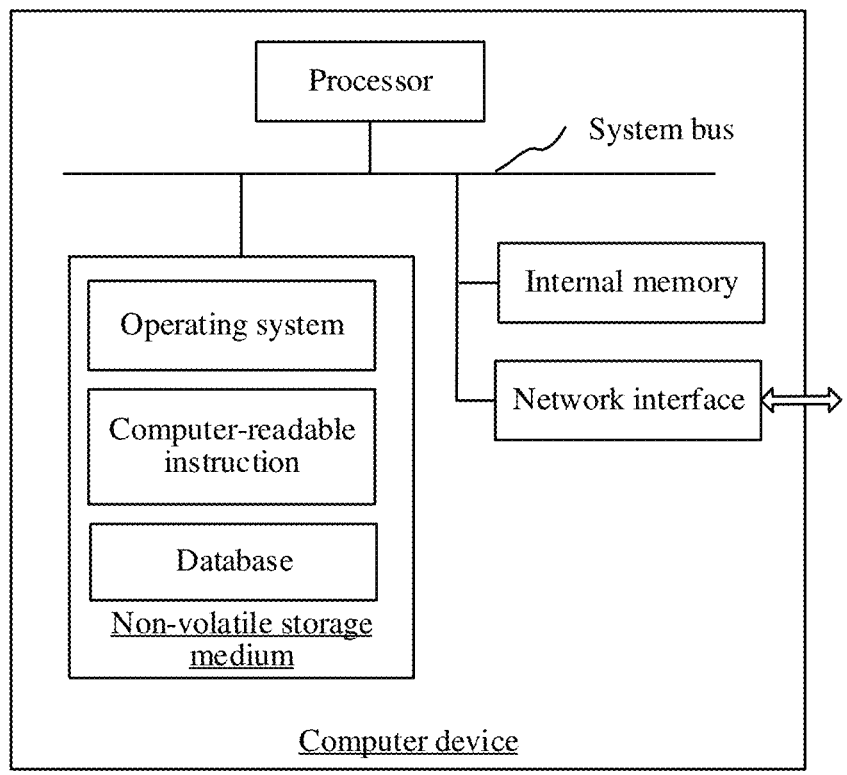
FIG. 21 is a diagram of an internal structure of a computer device according to an embodiment.
Figure 22:
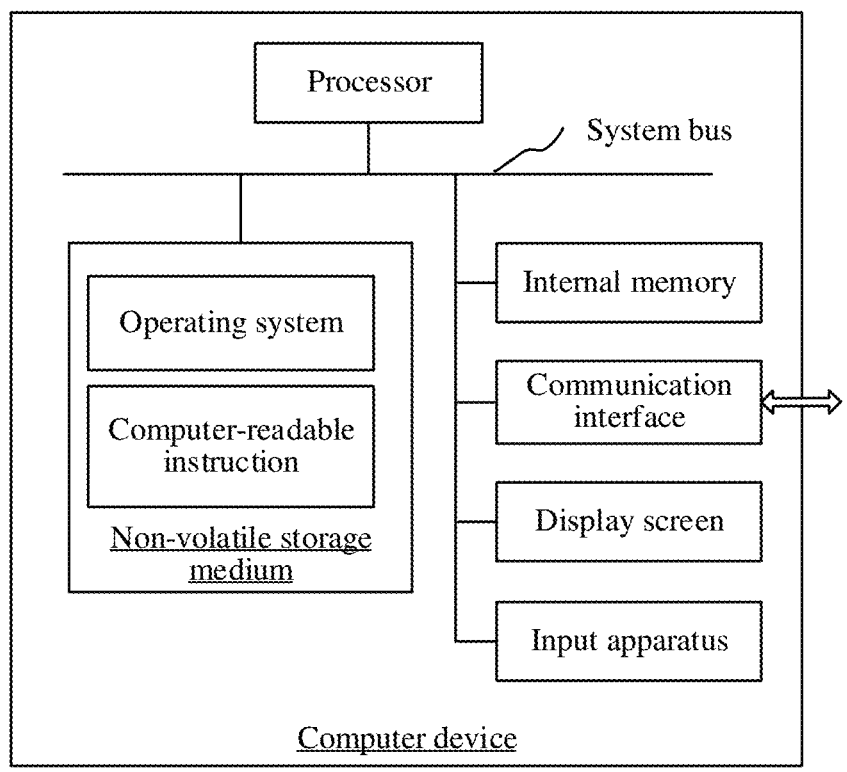
FIG. 22 is a diagram of an internal structure of a computer device according to another embodiment.

A person skilled in the art may understand that the structures shown in FIG. 21 and FIG. 22 are only block diagrams of a partial structure related to the solution of this application, and do not limit the computer device to which the solution of this application is applied. Specifically, the computer device may include more or fewer components than those shown in figures, or some components may be combined, or different component deployment may be used.

In an embodiment, a computer device is further provided, including: a memory and one or more processors, the memory storing computer-readable instructions, the one or more processors, when executing the computer-readable instructions, implementing the steps in the embodiments of the method for reconstructing a three-dimensional model described above.

In an embodiment, a computer device is further provided, including: a memory and one or more processors, the memory storing computer-readable instructions, the one or more processors, when executing the computer-readable instructions, implementing the steps in the embodiments of the method for training a three-dimensional reconstruction model described above.

In an embodiment, one or more computer-readable storage media are provided, storing computer-readable instructions, the computer-readable instructions, when executed by one or more processors, implementing the steps in the embodiments of the method for reconstructing a three-dimensional model described above.

In an embodiment, one or more computer-readable storage media are provided, storing computer-readable instructions, the computer-readable instructions, when executed by one or more processors, implementing the steps in the embodiments of the method for training a three-dimensional reconstruction model described above.

In an embodiment, a computer program product or a computer program is provided. The computer program product or the computer program includes computer-readable instructions, the computer-readable instructions being stored in a computer-readable storage medium. A processor of a computer device reads the computer-readable instructions from the computer-readable storage medium, and the processor executes the computer-readable instructions, to cause the computer device to perform the steps in the above method embodiments.

A person of ordinary skill in the art may understand that some or all procedures in the foregoing method embodiments may be implemented by a computer-readable instruction instructing related hardware. The computer-readable instruction may be stored in a non-volatile or non-transitory computer-readable storage medium, and when the computer-readable instruction is executed, the procedures of the foregoing method embodiments may be performed. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

Technical features of the foregoing embodiments may be combined in different ways to form other embodiments. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of this application, which are described specifically and in detail, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of this application is subject to the protection scope of the appended claims.

What is claimed is:

1. A method for reconstructing a three-dimensional model, performed by a computer device, the method comprising:
obtaining an image feature coefficient of an input image;
obtaining, based on the image feature coefficient, a texture of the input image, and a shape of the input image, a global feature map and an initial local feature map, the global feature map comprising a global texture feature map and a global shape feature map;
performing edge smoothing on the initial local feature map to obtain a target local feature map, the target local feature map comprising a local texture feature map and a local shape feature map;
modifying the target local feature map to be of a same size as the global feature map,
splicing the global feature map and the target local feature map based on the texture to obtain a target texture image, wherein the splicing comprises fusing pixels located at a same position in the global texture feature map and the local texture feature map;
splicing the global feature map and the target local feature map based on the shape to obtain a target shape image, wherein the splicing comprises fusing pixels located at a same position in the global shape feature map and the local shape map; and
performing three-dimensional model reconstruction based on the target texture image and the target shape image to obtain a target three-dimensional model.

2. The method according to claim 1, wherein the performing edge smoothing on the initial local feature map, to obtain a target local feature map comprises:
obtaining a boundary of the initial local feature map;
obtaining distances between pixels in the initial local feature map and the boundary; and
performing edge smoothing on the initial local feature map according to the distances to obtain the target local feature map.

3. The method according to claim 2, wherein the performing edge smoothing on the initial local feature map according to the distances, to obtain the target local feature map comprises:
obtaining an edge region of the initial local feature map according to the distances;
determining feature weight values corresponding to pixels of the edge region according to the distances, wherein a feature weight value corresponding to a long-distance pixel is greater than a feature weight value corresponding to a short-distance pixel;
generating a gradient smooth feature map according to feature weight values corresponding to the pixels of the initial local feature map, wherein a feature weight value corresponding to a pixel located outside the edge region of the initial local feature map is a preset weight value, and feature values of pixels in the gradient smooth feature map are obtained according to the corresponding feature weight values; and
multiplying the feature values of the pixels in the gradient smooth feature map by feature values of the corresponding pixels in the initial local feature map, to obtain the target local feature map according to a multiplication result.

4. The method according to claim 1, wherein:
the input image is a face image,
the target local feature map comprises a key part feature map corresponding to a facial key part, and
the target local feature map is a facial organ feature map generated by:
performing feature value padding on external regions of key part feature maps to obtain padded key part feature maps with a same size as the global feature map; and
merging the padded key part feature maps to obtain the facial organ feature map.

5. The method according to claim 4, wherein the facial key part comprises at least one of a left eye, a right eye, a nose, or a mouth.

6. The method according to claim 1, wherein:
wherein the splicing the global texture feature map and the local texture feature map generates a spliced texture feature map,
wherein the splicing the global shape feature map and the local shape feature map generates a spliced texture feature map, and wherein the method further comprises:
- convolving the spliced texture feature map to integrate a global texture feature and a local texture feature to obtain the target texture image; and
- convolving the spliced shape feature map to integrate a global shape feature and a local shape feature to obtain the target shape image.

7. The method according to claim 6, wherein:
the global feature map and the target local feature map each correspond to at least one feature channel,
the splicing the global texture feature map and the local texture feature map comprises splicing the global texture feature map and the local texture feature map in each feature channel,
the convolving the spliced texture feature map comprises convolving a feature map spliced in each feature channel to integrate the global texture feature and the local texture feature to obtain the target texture image,
the splicing the global shape feature map and the local shape feature map comprises splicing the global shape feature map and the local shape feature map in each feature channel, and
convolving the spliced shape feature map comprises convolving a feature map spliced in each feature channel to integrate the global shape feature and the local shape feature to obtain the target shape image.

8. The method according to claim 1, wherein the obtaining an image feature coefficient of an input image comprises:
- performing depthwise convolution on the input image by a convolutional autoencoder; and
- obtaining, according to a depthwise convolution result, a texture feature coefficient and a shape feature coefficient of the input image as the image feature coefficient.

9. The method according to claim 1, wherein the obtaining, based on the image feature coefficient, a texture of the input image, and a shape of the input image, a global feature map and an initial local feature map comprises:
- performing, by a deconvolution layer in a global decoder according to the image feature coefficient, feature decoding on the input image, to obtain the global feature map; and
- performing, by a deconvolution layer in a local decoder according to the image feature coefficient, feature decoding on the input image, to obtain the initial local feature map.

10. The method according to claim 9, wherein:
the local decoder comprises a facial key part decoder that is used to perform the feature decoding, and
a key part feature map obtained by the feature decoding is used as the initial local feature map.

11. The method according to claim 1, wherein the input image is a face image, the method further comprising:
- obtaining a target feature point of a two-dimensional image corresponding to the target three-dimensional model;
- obtaining a template three-dimensional model;
- obtaining a template feature point of a two-dimensional image corresponding to the template three-dimensional model;
- inputting the target feature point and the template feature point as paired data into a face changing model; and
- receiving, as output from the face changing model and based on the paired data, a face-changed three-dimensional model, wherein the face-changed three-dimensional model comprises a global feature of the target three-dimensional model and a local feature of the template three-dimensional model.

12. The method according to claim 11, wherein the obtaining a template three-dimensional model comprises:
- obtaining a present template face image;
- obtaining a template global feature map and an initial template local feature map based on the texture and the shape of the template face image;
- performing edge smoothing on the initial template local feature map to obtain a target template local feature map;
- splicing the template global feature map and the target template local feature map based on the texture to obtain a template facial texture image;
- splicing the template global feature map and the target template local feature map based on the shape to obtain a template facial shape image; and
- performing three-dimensional model reconstruction according to the template facial texture image and the template facial shape image to obtain the template three-dimensional model.

13. A method for training a three-dimensional reconstruction model, performed by a computer device, the method comprising:
- obtaining an image feature coefficient and a rendering coefficient of a training image;
- inputting the image feature coefficient into a three-dimensional reconstruction model based on deep learning, to cause the three-dimensional reconstruction model to:
  - obtain an image feature coefficient of an input image;
  - obtaining, based on the image feature coefficient, a texture of the training image, and a shape of the training image, a global feature map and an initial local feature map, the global feature map comprising a global texture feature map and a global shape feature map;
  - performing edge smoothing on the initial local feature map to obtain a target local feature map, the target local feature map comprising a local texture feature map and a local shape feature map;
  - modify the target local feature map to be of a same size as the global feature map,
  - splice the global feature map and the target local feature map based on the texture to obtain a target texture image, wherein the splicing comprises fusing pixels located at a same position in the texture feature map and the local texture feature map;
  - splice the global feature map and the target local feature map based on the shape to obtain a target shape image, wherein the splicing comprises fusing pixels located at a same position in the global shape feature map and the local shape map; and
  - perform three-dimensional model reconstruction based on the target texture image and the target shape image to obtain a predicted three-dimensional model;
- performing image rendering on the predicted three-dimensional model based on the rendering coefficient to obtain a predicted two-dimensional image; and
- obtain a trained three-dimensional reconstruction model by training the three-dimensional reconstruction model according to an error between the training image and the predicted two-dimensional image until a convergence condition is met.

14. The method according to claim 13, wherein the obtaining an image feature coefficient and a rendering coefficient of a training image comprises:

performing depthwise convolution on the training image by a convolutional autoencoder, wherein the convolutional autoencoder comprises a decoder and an encoder;

obtaining, by the decoder according to a depthwise convolution result, the image feature coefficient of the training image, wherein the image feature coefficient comprises a texture feature coefficient of the training image and a shape feature coefficient of the training image; and obtaining, by the encoder according to the depthwise convolution result, the rendering coefficient of the training image, wherein the rendering coefficient comprises a warping coefficient of the training image and an illumination coefficient of the training image.

15. An apparatus for reconstructing a three-dimensional model, comprising:

one or more processors; and memory storing computer-executable instructions that, when executed by the one or more processors, cause the apparatus to:

obtain an image feature coefficient of an input image;

obtaining, based on the image feature coefficient, a texture of the training image, and a shape of the training image, a global feature map and an initial local feature map, the global feature map comprising a global texture feature map and a global shape feature map;

performing edge smoothing on the initial local feature map to obtain a target local feature map, the target local feature map comprising a local texture feature map and a local shape feature map;

modify the target local feature map to be of a same size as the global feature map, splice the global feature map and the target local feature map based on the texture to obtain a target texture image, wherein the splicing comprises fusing pixels located at a same position in the global texture feature map and the local texture feature map;

splice the global feature map and the target local feature map based on the shape to obtain a target shape image, wherein the splicing comprises fusing pixels located at a same position in the global shape feature map and the local shape map; and perform three-dimensional model reconstruction based on the target texture image and the target shape image, to obtain a target three-dimensional model.

16. The apparatus of claim 15, wherein the performing the edge smoothing comprises:

obtaining a boundary of the initial local feature map;

obtaining distances between pixels in the initial local feature map and the boundary; and performing edge smoothing on the initial local feature map according to the distances, to obtain the target local feature map.

17. The apparatus according to claim 15, wherein:

the input image is a face image, the target local feature map comprises a key part feature map corresponding to a facial key part, and the target local feature map is a facial organ feature map generated by:

performing feature value padding on external regions of key part feature maps to obtain padded key part feature maps with a same size as the global feature map; and merging the padded key part feature maps to obtain the facial organ feature map.

18. The apparatus according to claim 15, wherein:

wherein the splicing the global texture feature map and the local texture feature map generates a spliced texture feature map, wherein the splicing the global shape feature map and the local shape feature map generates a spliced shape feature map, and wherein the memory storing computer-executable instructions that, when executed by the one or more processors, further cause the apparatus to perform convolving the spliced texture feature map to integrate a global texture feature and a local texture feature to obtain the target texture image; and convolving the spliced shape feature map to integrate a global shape feature and a local shape feature to obtain the target shape image.

19. The apparatus according to claim 15, wherein the obtaining an image feature coefficient of an input image comprises:

performing depthwise convolution on the input image by a convolutional autoencoder; and obtaining, according to a depthwise convolution result, a texture feature coefficient and a shape feature coefficient of the input image as the image feature coefficient.

20. The apparatus according to claim 15, wherein the obtaining, according to the image feature coefficient, a global feature map and an initial local feature map based on a texture and a shape of the input image comprises:

performing, by a deconvolution layer in a global decoder according to the image feature coefficient, feature decoding on the input image, to obtain the global feature map; and performing, by the deconvolution layer in a local decoder according to the image feature coefficient, feature decoding on the input image, to obtain the initial local feature map.

* * * * *